United States Patent
Djafarian et al.

(10) Patent No.: US 6,742,110 B2
(45) Date of Patent: May 25, 2004

(54) PREVENTING THE EXECUTION OF A SET OF INSTRUCTIONS IN PARALLEL BASED ON AN INDICATION THAT THE INSTRUCTIONS WERE ERRONEOUSLY PRE-CODED FOR PARALLEL EXECUTION

(75) Inventors: Karim Djafarian, Vence (FR); Gilbert Laurenti, Saint Paul de Vence (FR); Vincent Gillet, Le Rouret (FR)

(73) Assignee: Texas Instruments Incorporated, Dallas, TX (US)

(*) Notice: Subject to any disclaimer, the term of this patent is extended or adjusted under 35 U.S.C. 154(b) by 21 days.

(21) Appl. No.: 09/410,731

(22) Filed: Oct. 1, 1999

(65) Prior Publication Data

US 2003/0074543 A1 Apr. 17, 2003

(30) Foreign Application Priority Data

Oct. 6, 1998 (EP) ............................................. 98402455
Oct. 6, 1998 (EP) ............................................. 98402460

(51) Int. Cl.$^7$ ................................................. G06F 9/40
(52) U.S. Cl. ..................... 712/215; 712/216; 712/23; 712/212; 717/149
(58) Field of Search .............................. 712/215, 212, 712/23, 216, 24; 717/149

(56) References Cited

U.S. PATENT DOCUMENTS

| | | | |
|---|---|---|---|
| 4,847,748 A | * | 7/1989 | Yamahata et al. ........... 712/212 |
| 5,123,096 A | * | 6/1992 | Matuo ......................... 712/212 |
| 5,163,139 A | * | 11/1992 | Haigh et al. ................. 712/215 |
| 5,390,355 A | * | 2/1995 | Horst .......................... 712/215 |

(List continued on next page.)

FOREIGN PATENT DOCUMENTS

| | | |
|---|---|---|
| EP | 0 239 081 A2 | 9/1987 |
| EP | 0 467 152 A2 | 1/1992 |
| EP | 0 498 067 A2 | 8/1992 |

OTHER PUBLICATIONS

Kohn, Les and Neal Margulis, Introducint the Intel i860 64–Bit Microprocessor, IEEE Micro, 1989, vol. 9, Issue 4, pp. 15–30.*

(List continued on next page.)

*Primary Examiner*—Richard L. Ellis
*Assistant Examiner*—Tonia L. Meonske
(74) *Attorney, Agent, or Firm*—Robert D. Marshall, Jr.; W. James Brady, III; Frederick J. Telecky, Jr.

(57) ABSTRACT

A processing engine 10 for executing instructions in parallel comprises an instruction buffer 600 for holding at least two instructions, with the first instruction 602 in a first position and the second instruction 604 in a second position. A first decoder 612 provides decoding of the first instruction and generates first control signals. The first control signals include first resource control signals, first address generation control signals, and a first validity signal indicative of the validity of the first instruction in the first position. A second decoder 614 provides decoding of the second instruction and generates second control signals. The second control signals include second resource control signals, second address generation control signals, and a second validity signal indicative of the validity of the second instruction in the second position. Arbitration and merge logic 628, 630 is provided for arbitrating between the first and second control signals and for merging the first and second control signals for controlling power of execution of the instructions in accordance with a set of parallelism rules. A conditional execution unit 634 is responsive to false condition signals from the arbitration and merge logic to inhibit or modify the effect of the control signals. The parallelism rules provide for efficient instruction execution, and the avoidance of resource conflicts.

26 Claims, 18 Drawing Sheets

U.S. PATENT DOCUMENTS

| | | | | |
|---|---|---|---|---|
| 5,473,774 | A | | 12/1995 | Childers et al. |
| 5,488,729 | A | * | 1/1996 | Vegesna et al. ............. 712/215 |
| 5,560,028 | A | * | 9/1996 | Sachs et al. .................. 712/23 |
| 5,732,234 | A | | 3/1998 | Vassiliadis et al. |
| 5,742,783 | A | * | 4/1998 | Azmoodeh et al. ......... 712/212 |
| 5,794,003 | A | * | 8/1998 | Sachs ......................... 712/215 |
| 5,923,705 | A | * | 7/1999 | Willkie et al. ............. 375/219 |

OTHER PUBLICATIONS

TI–27677, *A Bit Field Processor*, co–filed as a regular application Oct. 1, 1999.

TI–27678, *Rounding Mechanisms in Processors*, co–filed as a regular application Oct. 1, 1999.

TI–27679, *Linear Vector Computation*, co–filed as a regular application Oct. 1, 1999.

TI–27680, *Hardware Accelerator / Acceleration for Processing Systems*, co–filed as a regular application Oct. 1, 1999.

TI–27681, *Pipeline Protection*, co–filed as a regular application Oct. 1, 1999.

TI–27682, *Pipelined Hardware Stack*, co–filed as a regular application Oct. 1, 1999.

TI–27683, *A Processor With Conditional Execution of an Instruction Pair*, co–filed as a regular application Oct. 1, 1999.

TI–27684, *A Processor With Local Instruction Looping*, co–filed as a regular application Oct. 1, 1999.

TI–27685, *Compound Memory Access Instructions*, co–filed as a regular application Oct. 1, 1999.

TI–27686, *A Processor With a Computed Repeat Instruction*, co–filed as a regular application Oct. 1, 1999.

TI–27688, *A Processor With Apparatus for Verifying Instruction Parallelism*, co–filed as a regular application Oct. 1, 1999.

TI–27689, *Cache Miss Benchmarking*, co–filed as a regular application Oct. 1, 1999.

TI–27690, *A Processor With Apparatus for Indexed Branch During Instruction Iteration*, co–filed as a regular application Oct. 1, 1999.

TI–27691, *Circular Buffer Management*, co–filed as a regular application Oct. 1, 1999.

TI–27700, *Method and Apparatus for Accessing a Memory Core Multiple Times in a Single Clock Cycle*, co–filed as a regular application Oct. 1, 1999.

TI–27757, *Improved Multiplier Accumulator Circuits*, co–filed as a regular application Oct. 1, 1999.

TI–27758, *Zero Anticipation Method and Apparatus*, co–filed as a regular application Oct. 1, 1999.

TI–27759, *Trace FIFO Management*, co–filed as a regular application Oct. 1, 1999.

TI–27760, *Stack Pointer Management*, co–filed as a regular application Oct. 1, 1999.

TI–27761, *Software Breakpoint in a Delay Slot*, co–filed as a regular application Oct. 1, 1999.

TI–27762, *Cache Coherence During Emulation*, co–filed as a regular application Oct. 1, 1999.

TI–27763, *Memory Access Using Byte Qualifiers*, co–filed as a regular application Oct. 1, 1999.

TI–27764, *Dual Interrupt Vector Mapping*, co–filed as a regular application Oct. 1, 1999.

TI–28234, *Pipeline Protection*, co–filed as a regular application Oct. 1, 1999.

TI–28433, *Improvements in or Relating to Microprocessors*, co–filed as a regular application Oct. 1, 1999.

Miller, R.E., et al.; *Floating–Duplex Decode and Execution of Instruction*, IBM Technical Disclosure Bulletin, vol. 23, No. 1, Jun. 1980, pp. 409–412.

* cited by examiner

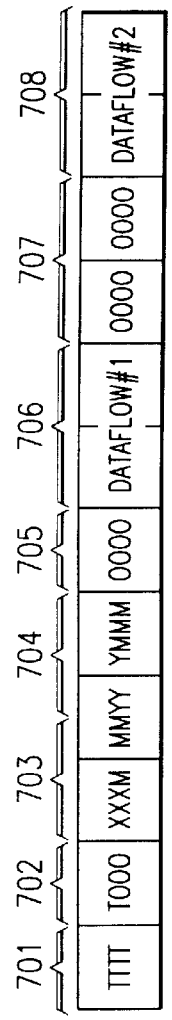

| INSTRUCTION #1 | INSTRUCTION #2 | EXAMPLE | PARALLELISM |
|---|---|---|---|
| SINGLE MEMORY | REGISTER | ACy = rnd (ACy + (Smem *ACx))<br>\|\| dst = dst + src | // ENABLE |
| SINGLE MEMORY | CONTROL | ACy = rnd (ACy + (Smem *ACx))<br>\|\| repeat (k8) | // ENABLE |
| SINGLE MEMORY | STACK | ACy = rnd (ACy + (Smem *ACx))<br>\|\| push (src) | // ENABLE |
| SINGLE MEMORY | SINGLE MEMORY | ACx = rnd (DRx *Xmem)<br>\|\| ACy = Ymem | // SOFT DUAL |
| DUAL MEMORY | REGISTER | ACx = (Xmem <<#16) + (Ymem <<#16)<br>\|\| DRy = DRx & k8 | // ENABLE |
| DUAL MEMORY | CONTROL | dbl (Ymem) = dbl (Xmem)<br>\|\| goto L8 | // ENABLE |
| DUAL MEMORY | STACK | ACy = rnd (ACy + Smem *ACx))<br>\|\| push (src1 src2) | // ENABLE |

| Operation | P1 | P2 | P3 | P4 | P5 | P6 | | |
|---|---|---|---|---|---|---|---|---|
| Single read | P1 | P2 | P3 | P4 | D | P6 | | |
| Single write | P1 | P2 | P3 | P4 | | | E | |
| Single write/shift | P1 | P2 | P3 | P4 | P5 | shift | | F |
| Dual read | P1 | P2 | P3 | C | D | P6 | | |
| Stack read (32 bit) | P1 | P2 | P3 | C | D | | | |
| Double read | P1 | P2 | P3 | P4 | C,D | P6 | | |
| Dual write | P1 | P2 | P3 | P4 | P5 | | E | F |
| Stack Write (32 bit) | P1 | P2 | P3 | P4 | P5 | | E | F |
| Double write | P1 | P2 | P3 | P4 | | | E,F | |
| Read/modify/write | P1 | P2 | P3 | P4 | D | modify | | |
| Dual read & coeff | P1 | P2 | P3 | C | B,D | P6 | | E |
| Double read/write | P1 | P2 | P3 | P4 | C,D | | E,F | |
| Duel read/write | P1 | P2 | P3 | C | D | | E | |
| Duel read/write/shift | P1 | P2 | P3 | C | | shift | | F |
| Double read/dual shift | P1 | P2 | P3 | P4 | P5 | shift | | E,F |

FIG. 15

| DAGEN #1 | DAGEN #2 | soft dual DAGEN | Operand #1 standalone fetch/write | Operand #2 standalone fetch/write | Operand #1 soft dual fetch/write | Operand #2 soft dual fetch/write |
|---|---|---|---|---|---|---|
| Smem_R | Smem_R | Dual_RR | DB | DB | DB | CB |
| Smem_R | Smem_W | Dual_RW | DB | EB | DB | EB |
| Smem_R | Smem_WF | Dual_RWF | DB | FB | DB | FB |
| Lmem_R | Lmem_W | Dual_RW | CB, DB | EB,FB | CB, DB | EB,FB |
| Lmem_R | Lmem_WF | Dual_RWF | CB, DB | EB,FB | CB, DB | EB,FB |
| Smem_W | Smem_W | Dual_WW | EB | EB | EB | FB |

| INSTRUCTIONS PAIR DAGEN CHECK | DAG_X | DAG_Y | P_MOD_Y | Smem_R | Smem_R_coef | Bmem_R | Smem_W | Bmem_W | Lmem_R | Lmem_W | Smem_RW | Smem_WF | Lmem_WF | Smem_RDW | Smem_RWD | Lmem_RDW | Lmem_RWD | Dual_WW | Dual_RR | Dual_RWF | Delay | Stack_R | Stack_W | Stack_RR | Stack_WW | Smem_R_Stack_W | Stack_R_Smem_W | Smem_R_Stack_WW | Stack_RR_Smem_W | Smem_R_Stack_WW | Stack_RR_Lmem_W | NO_DAG | EMUL |
|---|---|---|---|---|---|---|---|---|---|---|---|---|---|---|---|---|---|---|---|---|---|---|---|---|---|---|---|---|---|---|---|---|---|
| DAG_X | - | E | E* | - | - | - | E* | E* | - | E* | - | E* | E* | - | - | - | - | - | - | - | - | E | E | E | E | - | E | - | E | - | E | E | E |
| DAG_Y | E | - | - | E* | E* | E* | - | - | E* | - | E* | - | - | - | - | - | - | - | - | - | - | E | E | E | E | E | - | E | - | E | - | E | E |
| P_MOD_Y | E | - | - | - | - | - | - | - | - | - | - | - | - | - | - | - | - | - | - | - | - | E | - | E | - | - | - | - | - | - | - | E | E |
| Smem_R | - | E | - | S | S | - | S | - | - | - | S | - | - | - | - | - | - | - | - | - | - | - | E | - | E | - | - | - | - | - | - | E | E |
| Smem_R_coef | - | E | - | S | S | - | - | - | - | - | - | - | - | - | - | - | - | - | - | - | - | - | E | - | E | - | - | - | - | - | - | E | E |
| Bmem_R | - | E | - | - | - | - | - | - | - | - | - | - | - | - | - | - | - | - | - | - | - | - | E | - | E | - | - | - | - | - | - | E | E |
| Smem_W | E | - | - | S* | - | - | S | - | - | - | - | S | - | - | - | - | - | - | - | - | - | E | - | E | - | - | - | - | - | - | - | E | E |
| Bmem_W | E | - | - | - | - | - | - | - | - | - | - | - | - | - | - | - | - | - | - | - | - | E | - | E | - | - | - | - | - | - | - | E | E |
| Lmem_R | - | E | - | - | - | - | - | - | - | S | - | - | - | - | - | - | - | - | - | - | - | - | E | - | E | - | - | - | - | - | - | E | E |
| Lmem_W | E | - | - | - | - | - | - | S* | - | - | - | - | - | - | - | - | - | - | - | - | - | E | - | E | - | - | - | - | - | - | - | E | E |
| Smem_RW | - | E | - | - | - | - | - | - | - | - | - | - | - | - | - | - | - | - | - | - | - | - | - | - | - | - | - | - | - | - | - | E | E |
| Smem_WF | E | - | - | S* | - | - | S* | - | - | - | - | - | - | - | - | - | - | - | - | - | - | E | E | E | - | - | - | - | - | - | - | E | E |
| Lmem_WF | E | - | - | - | - | - | - | - | - | - | - | - | - | - | - | - | - | - | - | - | - | - | E | - | E | - | - | - | - | - | - | E | E |
| Smem_RDW | - | - | - | - | - | - | - | - | - | - | - | - | - | - | - | - | - | - | - | - | - | - | - | - | - | - | - | - | - | - | - | E | E |
| Smem_RWD | - | - | - | - | - | - | - | - | - | - | - | - | - | - | - | - | - | - | - | - | - | - | - | - | - | - | - | - | - | - | - | E | E |
| Lmem_RDW | - | - | - | - | - | - | - | - | - | - | - | - | - | - | - | - | - | - | - | - | - | - | - | - | - | - | - | - | - | - | - | E | E |
| Lmem_RWD | - | - | - | - | - | - | - | - | - | - | - | - | - | - | - | - | - | - | - | - | - | - | - | - | - | - | - | - | - | - | - | E | E |
| Dual_WW | - | - | - | - | - | - | - | - | - | - | - | - | - | - | - | - | - | - | - | - | - | E | - | E | - | - | - | - | - | - | - | E | E |
| Dual_RR | - | - | - | - | - | - | - | - | - | - | - | - | - | - | - | - | - | - | - | - | - | - | E | - | E | - | - | - | - | - | - | E | E |
| Dual_RW | - | - | - | - | - | - | - | - | - | - | - | - | - | - | - | - | - | - | - | - | - | - | - | - | - | - | - | - | - | - | - | E | E |
| Dual_RWF | - | - | - | - | - | - | - | - | - | - | - | - | - | - | - | - | - | - | - | - | - | E | E | - | - | - | - | - | - | - | - | E | E |
| Delay | - | - | - | - | - | - | - | - | - | - | - | - | - | - | - | - | - | - | - | - | - | - | - | - | - | - | - | - | - | - | - | E | E |
| Stack_R | E | E | E* | - | - | - | E* | E* | - | E* | - | E* | E* | - | - | - | - | E* | - | - | E* | - | - | - | - | - | - | - | - | - | - | E | E |
| Stack_W | E | E | - | E* | E* | E* | - | - | E* | - | E* | - | - | - | - | - | - | - | E* | - | E* | - | - | - | - | - | - | - | - | - | - | E | E |
| Stack_RR | E | E | E* | - | - | - | E* | E* | - | E* | - | E* | E* | - | - | - | - | E* | - | - | - | - | - | - | - | - | - | - | - | - | - | E | E |
| Stack_WW | E | E | - | E* | E* | E* | - | - | E* | - | - | - | - | - | - | - | - | - | E* | - | - | - | - | - | - | - | - | - | - | - | - | E | E |
| Smem_R_Stack_W | - | E | - | - | - | - | - | - | - | - | - | - | - | - | - | - | - | - | - | - | - | - | - | - | - | - | - | - | - | - | - | E | E |
| Stack_R_Smem_W | E | - | - | - | - | - | - | - | - | - | - | - | - | - | - | - | - | - | - | - | - | - | - | - | - | - | - | - | - | - | - | E | E |
| Smem_R_Stack_WW | - | E | - | - | - | - | - | - | - | - | - | - | - | - | - | - | - | - | - | - | - | - | - | - | - | - | - | - | - | - | - | E | E |
| Stack_RR_Smem_W | E | - | - | - | - | - | - | - | - | - | - | - | - | - | - | - | - | - | - | - | - | - | - | - | - | - | - | - | - | - | - | E | E |
| Smem_R_Stack_WW | - | E | - | - | - | - | - | - | - | - | - | - | - | - | - | - | - | - | - | - | - | - | - | - | - | - | - | - | - | - | - | E | E |
| Stack_RR_Lmem_W | E | - | - | - | - | - | - | - | - | - | - | - | - | - | - | - | - | - | - | - | - | - | - | - | - | - | - | - | - | - | - | E | E |
| NO_DAG | E | E | E* | E* | E* | E* | E* | E* | E* | E* | E* | E* | E* | E* | E* | E* | E* | E* | E* | E* | E* | E | E | E | E | E* | E* | E* | E* | E* | E* | E | E |
| EMUL | E | E | E* | E* | E* | E* | E* | E* | E* | E* | E* | E* | E* | E* | E* | E* | E* | E* | E* | E* | E* | E | E | E | E | E* | E* | E* | E* | E* | E* | E | E |

*FIG. 17*

| INSTRUCTIONS PAIR OPERATOR CHECK | AU-ALU | AU-SWAP | AU-LOAD | AU-STORE | DU-ALU | DU-SHIFTER | DU-MAC | DU-LOAD | DU-STORE | DU-SHIFT-STORE | DU-SWAP | PU-OPERATION | PU-LOAD | PU-STORE |
|---|---|---|---|---|---|---|---|---|---|---|---|---|---|---|
| AU-ALU | - | X | X | X | X | X | X | X | X | X | X | X | X | X |
| AU-SWAP | X | - | X | X | X | X | X | X | X | X | X | X | X | X |
| AU-LOAD | X | X | X | X | X | X | X | X | X | X | X | X | X | X |
| AU-STORE | X | X | X | X | X | X | X | X | X | X | X | X | X | X |
| DU-ALU | X | X | X | X | - | - | - | X | X | X | X | X | X | X |
| DU-SHIFTER | X | X | X | X | - | - | - | X | X | - | X | X | X | X |
| DU-MAC | X | X | X | X | - | - | - | X | X | X | X | X | X | X |
| DU-LOAD | X | X | X | X | X | X | X | X | X | X | X | X | X | X |
| DU-STORE | X | X | X | X | X | X | X | X | X | X | X | X | X | X |
| DU-SHIFT-STORE | X | X | X | X | X | - | X | X | X | - | X | X | X | X |
| DU-SWAP | X | X | X | X | X | X | X | X | X | X | - | X | X | X |
| PU-OPERATION | X | X | X | X | X | X | X | X | X | X | X | - | X | X |
| PU-LOAD | X | X | X | X | X | X | X | X | X | X | X | X | X | X |
| PU-STORE | X | X | X | X | X | X | X | X | X | X | X | X | X | X |

*FIG. 18*

PREVENTING THE EXECUTION OF A SET OF INSTRUCTIONS IN PARALLEL BASED ON AN INDICATION THAT THE INSTRUCTIONS WERE ERRONEOUSLY PRE-CODED FOR PARALLEL EXECUTION

This application claims priority under 35 USC 119 to S.N. 98402460.4, filed in Europe on Oct. 6, 1998 (TI-27688EU) and S.N. 98402455.4, filed in Europe on Oct. 6, 1998 (TI-28433EU).

FIELD OF THE INVENTION

The present invention relates to the verification of instruction parallelism in a processing engine. In particular, the invention relates to a processing engine providing a verification of instruction parallelism, and to a method of verifying instruction parallelism in a processing engine.

BACKGROUND OF THE INVENTION

In a processing engine providing parallel instruction execution, there is the potential for resource conflicts to occur. Resource conflicts can result from two instructions requiring the use in parallel of a common resource, such as a register, an arithmetic unit, a bus, a memory location, and so on.

SUMMARY OF THE INVENTION

In order to avoid resource conflicts, it would be desirable to establish certain rules for parallel instructions to be valid. These rules need to be obeyed when compiling instructions for execution. However, it would further be desirable to verify the validity of parallelism of the instructions prior to execution to avoid conflicts at runtime.

There is a need to provide a validation methodology that can provide robustness and predictability of operation. Preferably, systematic debugging should be possible to take account of possible illegal combinations of instruction.

The present invention seeks to provide a method and a mechanism for verifying the validity of the instruction parallelism.

Particular and preferred aspects of the invention are set out in the accompanying independent and dependent claims. Combinations of features from the dependent claims may be combined with features of the independent claims as appropriate and not merely as explicitly set out in the claims.

In accordance with a first aspect of the invention, there is provided a processing engine for executing instructions in parallel. The processing engine includes an instruction buffer for holding at least two instructions with a first instruction in a first position (e.g., for a lower program address) and a second instruction in a second position (e.g., for a higher program address). Decoding logic provides for decoding of the first instruction for generating first control signals and decoding of the second instruction for generating second control signals. Arbitration logic is operable to arbitrate between the first and second control signals for controlling parallel execution of the instructions in accordance with a set of parallelism rules.

The provision of first and second decoders for the first and second instructions, in combination with the arbitration logic, provides a structure for decoding instructions and processing those instructions in accordance with parallelism rules and enables effective and efficient decoding of instructions with avoidance of resource conflicts.

The operation of the arbitration logic in the processing engine hardware enables a robust and predictable validation methodology to be implemented. As this arbitration logic forms part of the processing engine hardware, a predictable programming model behavior can be achieved. In the case where an illegal instruction pair attempts to execute, integrated validation in an embodiment of the invention can result in at least partial execution occurring in a predictable manner.

The first and second control signals can include respective validity signals indicative of the validity of the first and second instructions in the first and second positions, respectively. The arbitration logic can include data address generation control signal arbitrating logic for arbitrating between the first and second validity signals. The first and second control signals can also include respective first and second data address generation control signals. The data address generation control signal arbitration logic can also be operable to arbitrate between the first and second data address generation control signals according to the set of parallelism rules.

The data address generation control signal arbitration logic is operable selectively to cause inhibiting and/or modifying of the effect of the data address generation control signals dependent upon the result of the data address generation control signal arbitration. In particular, the data address generation control signal arbitration logic can be operable to generate a false condition signal in response to detection of a data address generation control signal combination which is invalid in accordance with the parallelism rules. A conditional execution unit can be responsive to the false condition signal to inhibit and/or modify application of the data address generation control signals.

Data address generation control signal merge logic can be provided for generating merged data address generation control signals from the first and second data address generation control signals.

A data address generating unit can be responsive to the first and second and/or the merged address generation control signals.

The first and second control signals can also include first and second resource control signals, respectively. The arbitration logic can comprises resource control signal arbitration logic for arbitrating between the first and second resource control signals according to the parallelism rules.

The resource control signal arbitration logic can be operable selectively to cause inhibiting and/or modifying of the effect of the resource control signals dependent upon the result of the resource control signal arbitration. In particular, the resource control signal arbitration logic can be operable to generate a false condition signal in response to detection of a resource control signal combination which is invalid in accordance with the parallelism rules. The conditional execution unit can be responsive to the false condition signal to inhibit and/or modify the effect of the resource control signals.

Resource control signal merge logic can be provided for generating merged resource signals from the first and second resource control signals.

Execution units, such as an arithmetic unit or a program unit, can be responsive to the first and second and/or merged resource control signals.

The resource control signal arbitration logic can be operable to control access to a common bus resource (e.g., a bus to be accesses or an order of bus access) for the first and second instructions. It can also be operable to modify an order of instructions according to the parallelism rules.

The processing unit can, for example, be in the form of a digital signal processor. The processing engine can be integrated in an integrated circuit.

In accordance with another aspect of the invention, there is provided a telecommunications apparatus comprising a processing engine according to any preceding claim. The telecommunications apparatus can include, for example, a user input device, a display, a wireless telecommunications interface and an aerial.

In accordance with a further aspect of the invention, there is provided a method of executing instructions in parallel in a processing engine, which processing engine comprises an instruction buffer for holding at least two instructions with a first instruction in a first position (e.g., for a lower program address) and a second instruction in a second position (e.g., for a higher program address). The method includes steps of:

a) decoding the first instruction and generating first control signals;

b) decoding the second instruction and generating second control signals; and c) arbitrating between the first and second control signals for controlling parallel execution of the instructions in accordance with a set of parallelism rules.

BRIEF DESCRIPTION OF THE DRAWINGS

Particular embodiments in accordance with the invention will now be described, by way of example only, and with reference to the accompanying drawings in which like reference signs are used to denote like parts, unless otherwise stated, and in which:

FIG. 8 illustrates examples of dual instructions;

FIG. 9 illustrates the relative timing of bus cycles for various instructions;

FIG. 10 illustrates an example of a soft dual instruction;

FIG. 15 is a table illustrating operand fetch control for a soft dual instruction;

FIG. 17 is a table for explaining parallelism rules;

FIG. 18 is a further table for explaining parallelism rules;

DESCRIPTION OF PARTICULAR EMBODIMENTS

Although the invention finds particular application to Digital Signal Processors (DSPs), implemented for example in an Application Specific Integrated Circuit (ASIC), it also finds application to other forms of processing engines.

Figure 1:
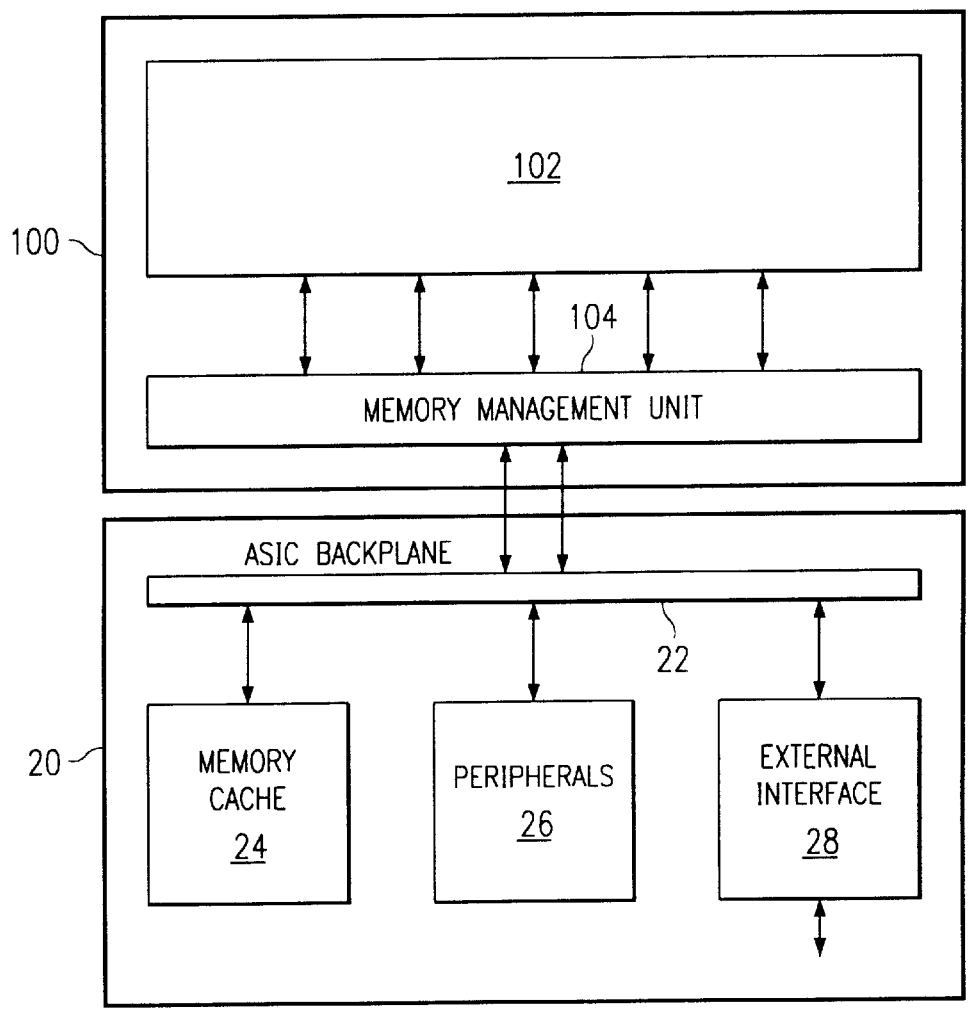
FIG. 1 is a schematic block diagram of a processor in accordance with an embodiment of the invention.

FIG. 1 is a block diagram of a microprocessor 10 which has an embodiment of the present invention. Microprocessor 10 is a digital signal processor ("DSP"). In the interest of clarity, FIG. 1 only shows those portions of microprocessor 10 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 10 relevant to an embodiment of the present invention are explained in sufficient detail hereinbelow, so as to enable one of ordinary skill in the microprocessor art to make and use the invention.

Several example systems which can benefit from aspects of the present invention are described in U.S. Pat. No. 5,072,418, which was incorporated by reference herein, particularly with reference to FIGS. 2–18 of U.S. Pat. No. 5,072,418. A microprocessor incorporating an aspect of the present invention to improve performance or reduce cost can be used to further improve the systems described in U.S. Pat. No. 5,072,418. Such systems include, but are not limited to, industrial process controls, automotive vehicle systems, motor controls, robotic control systems, satellite telecommunication systems, echo canceling systems, modems, video imaging systems, speech recognition systems, vocoder-modem systems with encryption, and such.

A description of various architectural features and a description of a complete set of instructions of the microprocessor of FIG. 1 is provided in co-assigned application Ser. No. 09/410,977 (TI-28433), which is incorporated herein by reference.

The basic architecture of an example of a processor according to the invention will now be described.

FIG. 1 is a schematic overview of a processor 10 forming an exemplary embodiment of the present invention. The processor 10 includes a processing engine 100 and a processor backplane 20. In the present embodiment, the processor is a Digital Signal Processor 10 implemented in an Application Specific Integrated Circuit (ASIC).

As shown in FIG. 1, the processing engine 100 forms a central processing unit (CPU) with a processing core 102 and a memory interface, or management, unit 104 for interfacing the processing core 102 with memory units external to the processor core 102.

The processor backplane 20 comprises a backplane bus 22, to which the memory management unit 104 of the processing engine is connected. Also connected to the backplane bus 22 is an instruction cache memory 24, peripheral devices 26 and an external interface 28.

It will be appreciated that in other embodiments, the invention could be implemented using different configurations and/or different technologies. For example, the processing engine 100 could form the processor 10, with the processor backplane 20 being separate therefrom. The processing engine 100 could, for example be a DSP separate from and mounted on a backplane 20 supporting a backplane bus 22, peripheral and external interfaces. The processing engine 100 could, for example, be a microprocessor rather than a DSP and could be implemented in technologies other than ASIC technology. The processing engine, or a processor including the processing engine, could be implemented in one or more integrated circuits.

Figure 2:
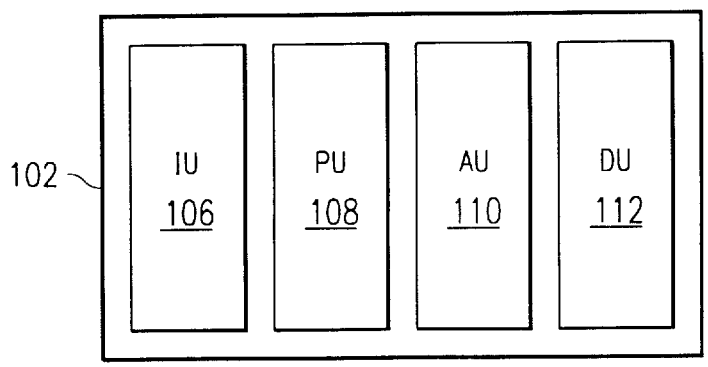
FIG. 2 is a schematic diagram of a core of the processor of FIG. 1.

FIG. 2 illustrates the basic structure of an embodiment of the processing core 102. As illustrated, the processing core 102 includes four elements, namely an Instruction Buffer Unit (I Unit) 106 and three execution units. The execution units are a Program Flow Unit (P Unit) 108, Address Data Flow Unit (A Unit) 110 and a Data Computation Unit (D Unit) 112 for executing instructions decoded from the Instruction Buffer Unit (I Unit) 106 and for controlling and monitoring program flow.

Figure 3:
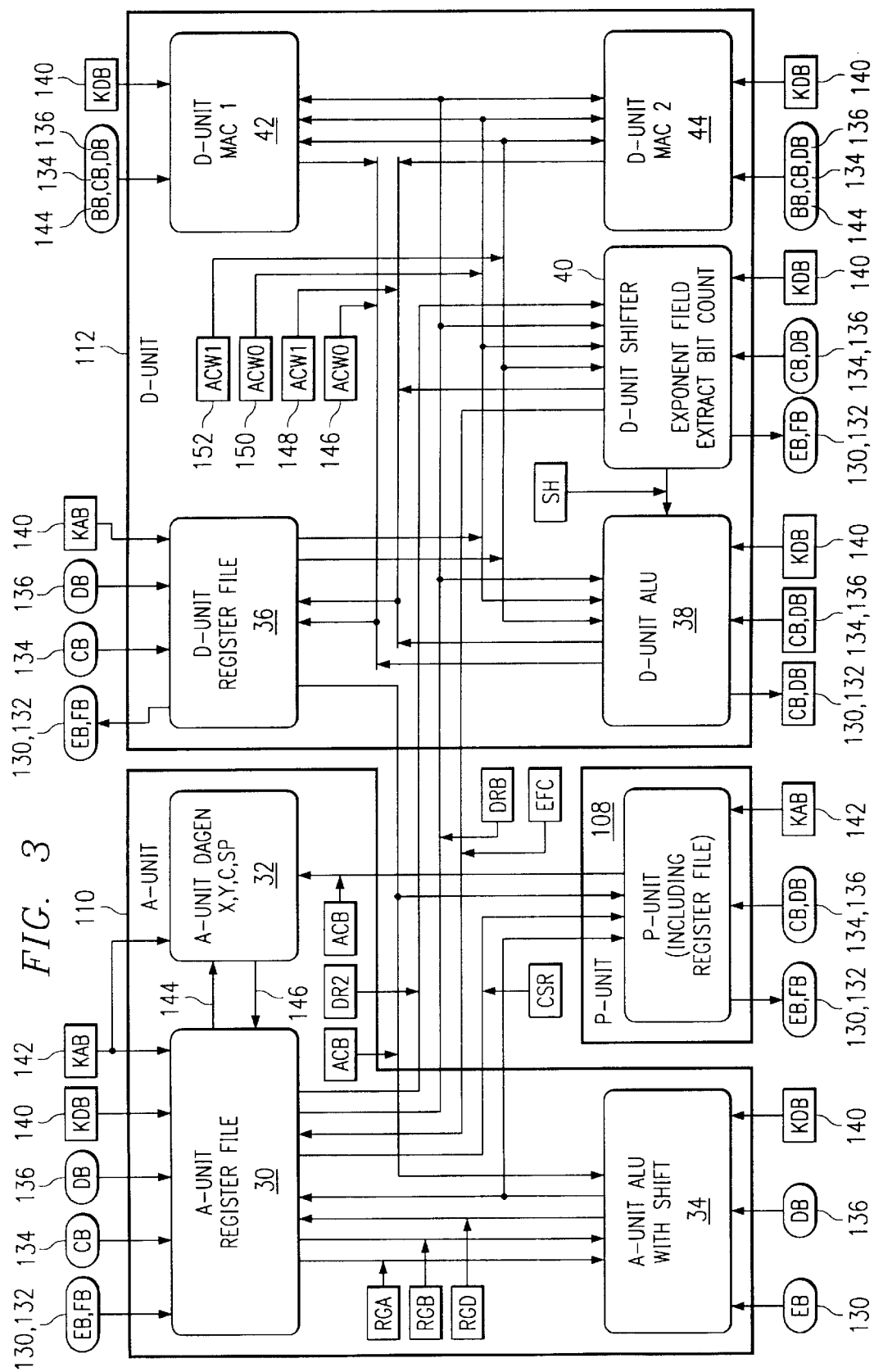
FIG. 3 is a more detailed schematic block diagram of various execution units of the core of the processor in FIG. 1.

FIG. 3 illustrates the P Unit 108, A Unit 110 and D Unit 112 of the processing core 102 in more detail and shows the bus structure connecting the various elements of the processing core 102. The P Unit 108 includes, for example, loop control circuitry, GoTo/Branch control circuitry and various registers for controlling and monitoring program flow such as repeat counter registers and interrupt mask, flag or vector registers. The P Unit 108 is coupled to general purpose Data Write busses (EB, FB) 130, 132, Data Read busses (CB, DB) 134, 136 and an address constant bus (KAB) 142. Additionally, the P Unit 108 is coupled to sub-units within the A Unit 110 and D Unit 112 via various busses labeled CSR, ACB and RGD.

As illustrated in FIG. 3, in the present embodiment the A Unit 110 includes a register file 30, a data address generation sub-unit (DAGEN) 32 and an Arithmetic and Logic Unit (ALU) 34. The A Unit register file 30 includes various registers, among which are 16 bit pointer registers (AR0–AR7) and data registers (DR0–DR3) which may also be used for data flow as well as address generation. Additionally, the register file includes 16 bit circular buffer registers and 7 bit data page registers. As well as the general purpose busses (EB, FB, CB, DB) 130, 132, 134, 136, a data constant bus 140 and address constant bus 142 are coupled to the A Unit register file 30. The A Unit register file 30 is coupled to the A Unit DAGEN unit 32 by unidirectional busses 144 and 146 respectively operating in opposite directions. The DAGEN unit 32 includes 16 bit X/Y registers and coefficient and stack pointer registers, for example for controlling and monitoring address generation within the processing engine 100.

The A Unit 110 also comprises the ALU 34 which includes a shifter function as well as the functions typically associated with an ALU such as addition, subtraction, and AND, OR and XOR logical operators. The ALU 34 is also coupled to the general-purpose busses (EB, DB) 130, 136 and an instruction constant data bus (KDB) 140. The A Unit ALU is coupled to the P Unit 108 by a PDA bus for receiving register content from the P Unit 108 register file. The ALU 34 is also coupled to the A Unit register file 30 by busses RGA and RGB for receiving address and data register contents and by a bus RGD for forwarding address and data registers in the register file 30.

As illustrated, the D Unit 112 includes a D Unit register file 36, a D Unit ALU 38, a D Unit shifter 40 and two multiply and accumulate units (MAC1, MAC2) 42 and 44. The D Unit register file 36, D Unit ALU 38 and D Unit shifter 40 are coupled to busses (EB, FB, CB, DB and KDB) 130, 132, 134, 136 and 140, and the MAC units 42 and 44 are coupled to the busses (CB, DB, KDB) 134, 136, 140 and data read bus (BB) 144. The D Unit register file 36 includes 40-bit accumulators (AC0–AC3) and a 16-bit transition register. The D Unit 112 can also utilize the 16 bit pointer and data registers in the A Unit 110 as source or destination registers in addition to the 40-bit accumulators. The D Unit register file 36 receives data from the D Unit ALU 38 and MACs 1&2 42, 44 over accumulator write busses (ACW0, ACW1) 146, 148, and from the D Unit shifter 40 over accumulator write bus (ACW1) 148. Data is read from the D Unit register file accumulators to the D Unit ALU 38, D Unit shifter 40 and MACs 1&2 42, 44 over accumulator read busses (ACR0, ACR1) 150, 152. The D Unit ALU 38 and D Unit shifter 40 are also coupled to sub-units of the A Unit 108 via various busses labeled EFC, DRB, DR2 and ACB.

Figure 4:
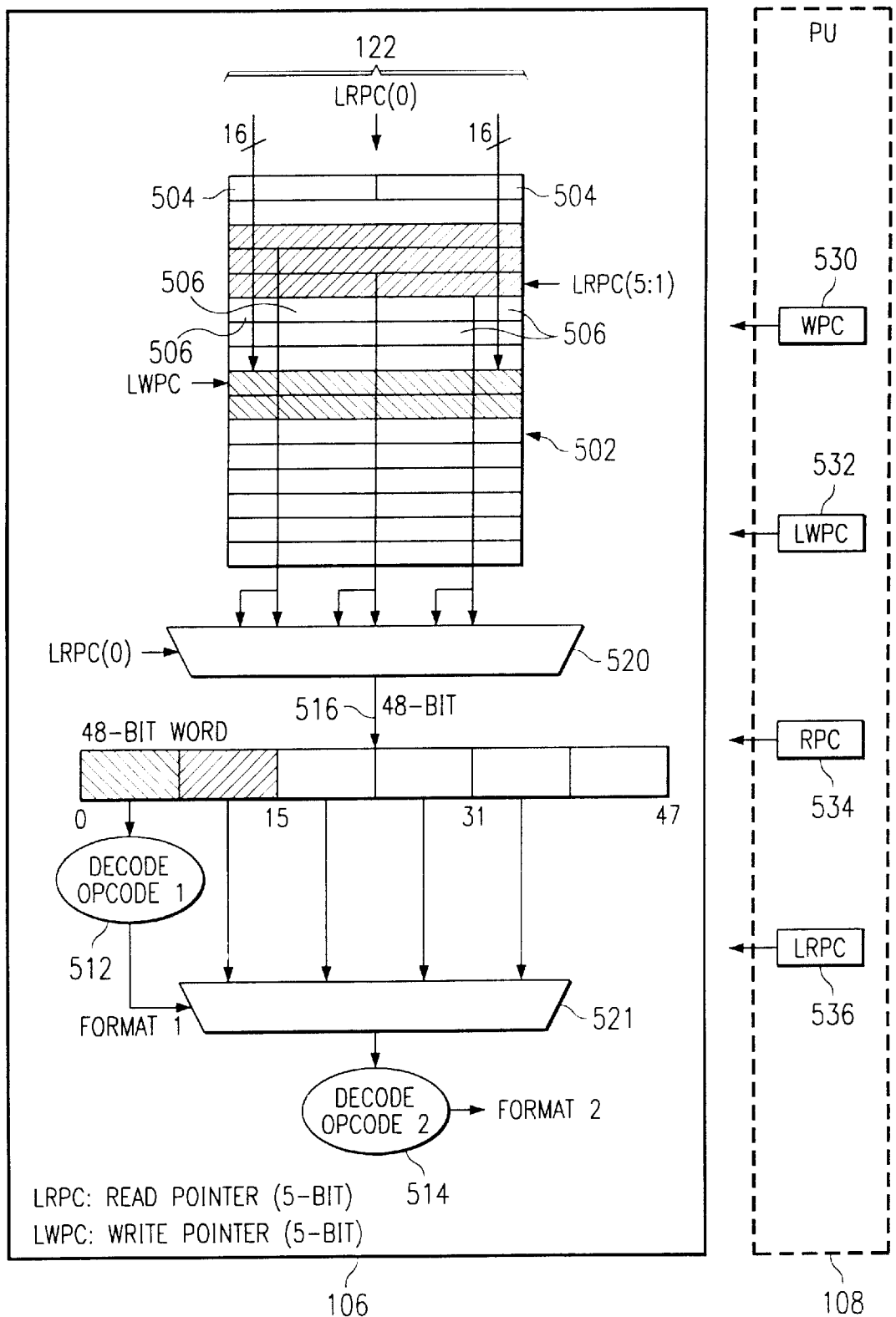
FIG. 4 is a schematic diagram of an instruction buffer queue and an instruction decoder controller of the processor of FIG. 1.

Referring now to FIG. 4, there is illustrated an instruction buffer unit 106 comprising a 32 word instruction buffer queue (IBQ) 502. The IBQ 502 comprises 32×16 bit registers 504, logically divided into 8 bit bytes 506. Instructions arrive at the IBQ 502 via the 32-bit program bus (PB) 122. The instructions are fetched in a 32-bit cycle into the location pointed to by the Local Write Program Counter (LWPC) 532. The LWPC 532 is contained in a register located in the P Unit 108. The P Unit 108 also includes the Local Read Program Counter (LRPC) 536 register, and the Write Program Counter (WPC) 530 and Read Program Counter (RPC) 534 registers. LRPC 536 points to the location in the IBQ 502 of the next instruction or instructions to be loaded into the instruction decoder(s) 512 and 514. That is to say, the LRPC 534 points to the location in the IBQ 502 of the instruction currently being dispatched to the decoders 512, 514. The WPC points to the address in program memory of the start of the next 4 bytes of instruction code for the pipeline. For each fetch into the IBQ, the next 4 bytes from the program memory are fetched regardless of instruction boundaries. The RPC 534 points to the address in program memory of the instruction currently being dispatched to the decoder(s) 512 and 514.

The instructions are formed into a 48-bit word and are loaded into the instruction decoders 512, 514 over a 48-bit bus 516 via multiplexors 520 and 521. It will be apparent to a person of ordinary skill in the art that the instructions may be formed into words comprising other than 48-bits, and that the present invention is not limited to the specific embodiment described above.

The bus 516 can load a maximum of two instructions, one per decoder, during any one instruction cycle. The combination of instructions may be in any combination of formats, 8, 16, 24, 32, 40 and 48 bits, which will fit across the 48-bit bus. Decoder 1, 512, is loaded in preference to decoder 2, 514, if only one instruction can be loaded during a cycle. The respective instructions are then forwarded on to the respective function units in order to execute them and to access the data for which the instruction or operation is to be performed. Prior to being passed to the instruction decoders, the instructions are aligned on byte boundaries. The alignment is done based on the format derived for the previous instruction during decoding thereof. The multiplexing associated with the alignment of instructions with byte boundaries is performed in multiplexors 520 and 521.

The processor core 102 executes instructions through a 7 stage pipeline, the respective stages of which will now be described with reference to FIG. 5.

The first stage of the pipeline is a PRE-FETCH (P0) stage 202, during which stage a next program memory location is addressed by asserting an address on the address bus (PAB) 118 of a memory interface, or memory management unit 104.

In the next stage, FETCH (P1) stage 204, the program memory is read and the I Unit 106 is filled via the PB bus 122 from the memory management unit 104.

The PRE-FETCH and FETCH stages are separate from the rest of the pipeline stages in that the pipeline can be interrupted during the PRE-FETCH and FETCH stages to break the sequential program flow and point to other instructions in the program memory, for example for a Branch instruction.

The next instruction in the instruction buffer is then dispatched to the decoder/s 512/514 in the third stage, DECODE (P2) 206, where the instruction is decoded and dispatched to the execution unit for executing that instruction, for example to the P Unit 108, the A Unit 110 or the D Unit 112. The decode stage 206 includes decoding at least part of an instruction including a first part indicating the class of the instruction, a second part indicating the format of the instruction and a third part indicating an addressing mode for the instruction.

The next stage is an ADDRESS (P3) stage 208, in which the address of the data to be used in the instruction is computed, or a new program address is computed should the instruction require a program branch or jump. Respective computations take place in the A Unit 110 or the P Unit 108 respectively.

In an ACCESS (P4) stage 210 the address of a read operand is output and the memory operand, the address of which has been generated in a DAGEN X operator with an Xmem indirect addressing mode, is then READ from indirectly addressed X memory (Xmem).

The next stage of the pipeline is the READ (P5) stage 212 in which a memory operand, the address of which has been generated in a DAGEN Y operator with an Ymem indirect addressing mode or in a DAGEN C operator with coefficient address mode, is READ. The address of the memory location to which the result of the instruction is to be written is output.

In the case of dual access, read operands can also be generated in the Y path, and write operands in the X path.

Finally, there is an execution EXEC (P6) stage 214 in which the instruction is executed in either the A Unit 110 or the D Unit 112. The result is then stored in a data register or accumulator, or written to memory for Read/Modify/Write or store instructions. Additionally, shift operations are performed on data in accumulators during the EXEC stage.

Figure 6:
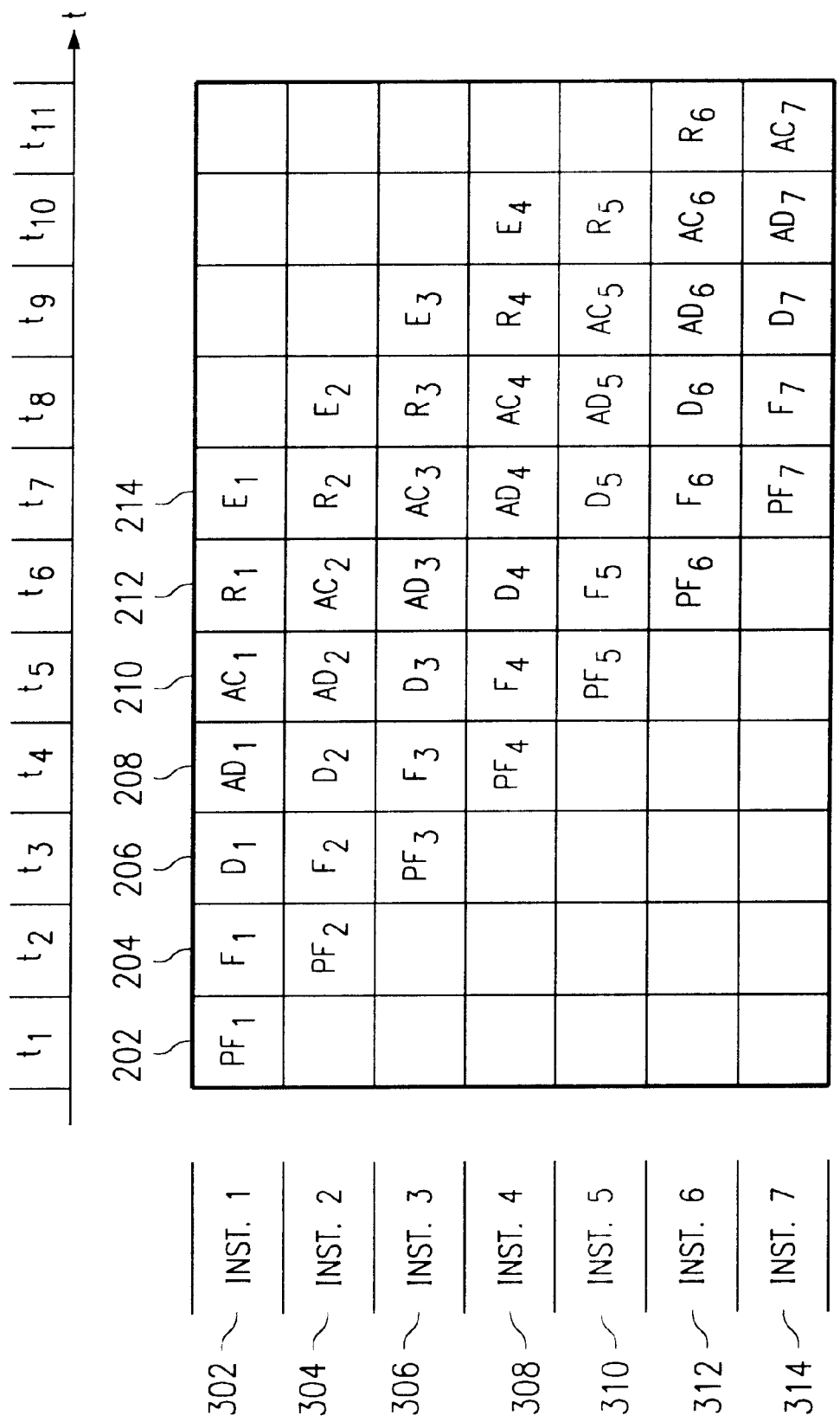
FIG. 6 is a diagrammatic illustration of an example of an operation of a pipeline in the processor of FIG. 1.

The basic principle of operation for a pipeline processor will now be described with reference to FIG. 6. As can be seen from FIG. 6, for a first instruction 302, the successive pipeline stages take place over time periods $T_1$–$T_7$. Each time period is a clock cycle for the processor machine clock. A second instruction 304, can enter the pipeline in period $T_2$, since the previous instruction has now moved on to the next pipeline stage. For instruction 3, 306, the PRE-FETCH stage 202 occurs in time period $T_3$. As can be seen from FIG. 6 for a seven stage pipeline a total of 7 instructions may be processed simultaneously. For all 7 instructions 302–314, FIG. 6 shows them all under process in time period $T_7$. Such a structure adds a form of parallelism to the processing of instructions.

Figure 7:
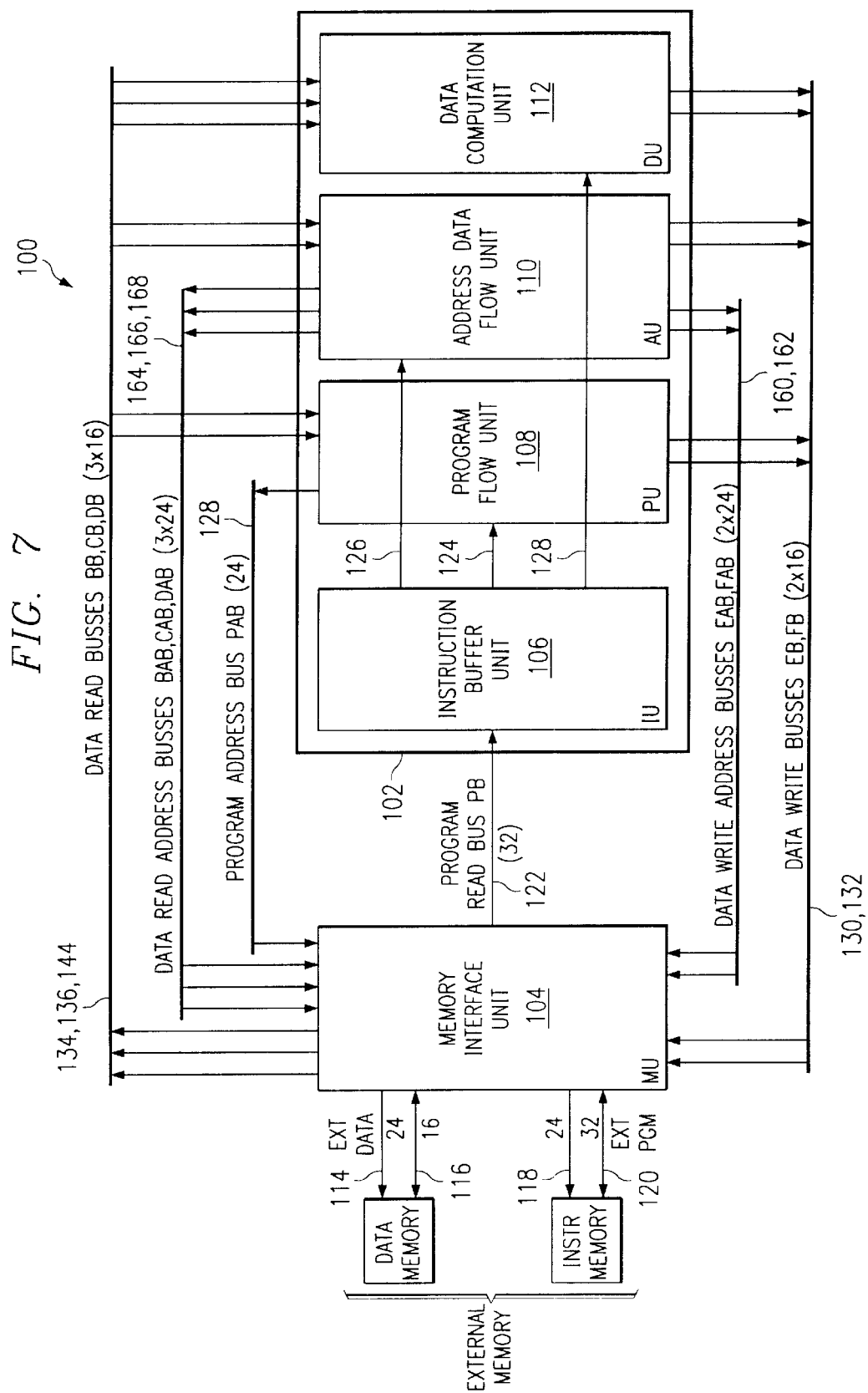
FIG. 7 is a schematic representation of the core of the processor for explaining the operation of the pipeline of the processor of FIG. 1.

As shown in FIG. 7, the present embodiment of the invention includes a memory management unit 104 which is coupled to external memory units (not shown) via a 24 bit address bus 114 and a bidirectional 16 bit data bus 116. Additionally, the memory management unit 104 is coupled to program storage memory (not shown) via a 24 bit address bus 118 and a 32 bit bidirectional data bus 120. The memory management unit 104 is also coupled to the I Unit 106 of the machine processor core 102 via a 32 bit program read bus (PB) 122. The P Unit 108, A Unit 110 and D Unit 112 are coupled to the memory management unit 104 via data read and data write busses and corresponding address busses. The P Unit 108 is further coupled to a program address bus 128.

More particularly, the P Unit 108 is coupled to the memory management unit 104 by a 24 bit program address bus 128, the two 16 bit data write busses (EB, FB) 130, 132, and the two 16 bit data read busses (CB, DB) 134, 136. The A Unit 110 is coupled to the memory management unit 104 via two 24 bit data write address busses (EAB, FAB) 160, 162, the two 16 bit data write busses (EB, FB) 130, 132, the three data read address busses (BAB, CAB, DAB) 164, 166, 168 and the two 16 bit data read busses (CB, DB) 134, 136. The D Unit 112 is coupled to the memory management unit 104 via the two data write busses (EB, FB) 130, 132 and three data read busses (BB, CB, DB) 144, 134, 136.

FIG. 7 represents the passing of instructions from the I Unit 106 to the P Unit 108 at 124, for forwarding branch instructions for example. Additionally, FIG. 7 represents the passing of data from the I Unit 106 to the A Unit 110 and the D Unit 112 at 126 and 128 respectively.

In a particular embodiment of the invention, the processing engine 100 is responsive to machine instructions in a number of formats. Examples of such instructions in different formats are illustrated in the following.

8 Bit Instruction: OOOO OOOO

This represents an eight bit instruction, for example a memory map qualifier (MMAP( )) or a read port qualifier (readport( )). Such a qualifier comprises merely an eight bit opcode (OOOO OOOO). In such a case parallelism is implicit.

16 Bit Instruction: OOOO OOOE FSSS FDDD

This represents an example of a sixteen bit instruction, for example an instruction where the content of a destination register (e.g., dst) becomes the sum of the prior content of that register (dst) and the content of a source register (src), that is:

*dst=dst+src*

Such an instruction comprises a seven bit opcode (OOOO OOO) with a one bit parallel enable field (E), a four bit source register identifier (FSSS) and a four bit destination register identifier (FDDD).

16 Bit Instruction: OOOO FDDD PPPM MMMI

This represents another example of a sixteen bit instruction, for example where the content of a destination register (e.g., dst) becomes the content of a memory location (Smem), that is:

*dst=Smem*

Such an instruction comprises a four bit opcode (OOOO), a four bit destination register identifier (FDDD), a three bit pointer address (PPP), a four bit address modifier (M MMM) and a direct/indirect address indicator (I).

24 Bit Instruction: OOOO OOOE LLLL LLLL oCCC CCCC

This represents an example of a twenty four bit instruction, for example a conditional instruction for a branch to and offset (L8) where a condition is met, that is:

*if(cond) goto L8*

Such an instruction comprises a seven bit opcode (OOOO OOO) with a one bit parallel enable field (E), an eight bit branch offset (LLLL LLLL), a one bit opcode extension (o) and a seven bit condition field (CCC CCCC).

24 Bit Instruction: OOOO OOOO PPPM MMMI SSDD ooU %

This is another example of a twenty-four bit instruction, for example a single memory operand instruction where the content of an accumulator ($AC_y$) becomes the result of rounding the sum of the content of another accumulator ($AC_x$) and the square of the content of a memory location (with optional rounding), and optionally the content of a data register (DR3) can become the content of the memory location, that is:

$$AC_y = rnd(AC_x + (Smem*Smem)), [, DR3 = Smem]$$

Such an instruction comprises an eight bit opcode (OOOO OOOO), a three bit pointer address (PPP), a four bit address modifier (M MMM), a one bit direct/indirect address indicator field (I), a two bit source accumulator identifier (SS), a two bit destination accumulator identifier (DD), a two bit opcode extension (oo), an update condition field (u), and a one bit rounding option field (%).

32 Bit Instruction: OOOO OOOO PPPM MMMI KKKK KKKK KKKK KKKK

This is an example of a thirty-two bit instruction, for example an instruction where the content of a test register (TC1) is set to 1 or 0 depending on the sign comparison of a memory location (Smem) to a constant value (K16), that is:

$$TC1 = (Smem == K16)$$

Such an instruction comprises an eight bit opcode (OOOO OOOO), a three bit pointer address (PPP), a four bit address modifier (M MMM), a one bit direct/indirect address indicator field (I) and a sixteen bit constant field (KKKK KKKK KKKK KKKK).

Hard Dual Instruction: OOOO OOOO XXXM MMYY YMMM SSDD ooox ssU %

This is an example of a 32 bit dual access instruction, which could be termed a "hard dual access instruction", or a hard programmed dual memory instruction, that is a dual instruction which has been programmed as such, for example, by a programmer. Such an instruction requires two DAGEN operators. A second instruction can be executed in parallel. This is typically a register or control instruction. Memory stack instructions can also be executed in parallel as long as there are no bus conflicts. An example of such an instruction is:

$$AC_y = rnd(DR_x * Xmem), Ymem = HI(AC_x << DR2)), [, DR3 = Xmem]$$

This instruction comprises an eight bit opcode (OOOO OOOO), a three bit Xmem pointer address (XXX) with a four bit address modifier (M MMM), a three bit Ymem pointer address (YYY) with a four bit address modifier (M MMM), a two bit source accumulator ($AC_x$) identifier (SS), a two bit destination accumulator ($AC_y$) identifier (DD), a three bit opcode extension (ooo), a don't care bit (x), a two bit source accumulator identifier (ss), a one bit optional DR3 update field (U) and a one bit optional rounding field (%).

FIG. 8 is a table illustrating combinations of instructions forming instruction pairs and also a soft dual instruction. In such instruction pairs, the first instruction of the pair is always a memory operation. It will be noted that where the second instruction is also a memory instruction, then this is configured as a soft dual instruction, that is a compound instruction.

Instructions which may be located in a second position of an instruction pair (i.e. for the higher program address of the pair) include a parallel enable field (E bit) to indicate whether the instruction can be performed in parallel with the first of a pair of instructions. The parallel enable bit is located at a predetermined offset from the instruction format boundary between the instructions. The decoder is arranged to be responsive to the 'E' bit in order to control instruction execution.

The reason for having a memory operation first in an instruction pair is that at the entry to the address decode stage of the processor pipeline, the decoder does not know the format of the instruction, or even where the format boundary is located. Memory address decoding is one of the critical stages of the pipeline to ensure good instruction throughput. Accordingly, it is necessary to be able reliably to know the location and size of the address bits for a memory instruction to be decoded in order that the decoding can commence even before the exact nature of the instruction is determined.

A further advantage which results from constraining a memory instruction to be located as the first instruction in an instruction pair is that it is then not necessary for a memory instruction to include a field indicating whether parallel operation is permitted. This makes the instruction set more efficient and allows improved code size.

Yet a further advantage is that the hardware necessary for decoding a second instruction of an instruction pair need only be a subset of the hardware for decoding the first instruction of the instruction pair. The first instruction is the instruction of the instruction pair with a lower program address than the second instruction of the instruction pair. Thus, the decode hardware for the instruction with a higher program address of an instruction pair can be a subset of the decode hardware for the instruction with a lower program address of an instruction pair. This enables a reduction in the silicon area and power consumption required for implementing and operating the decode hardware.

Where two instructions of an instruction pair can be performed in parallel, this takes place in respective decoding and execution stages. However, due to physical bus timing constraints, bus transfers can be staggered.

FIG. 9 illustrates the pipeline stage in which memory access takes place for different types of instructions, including dual instructions. It should be noted, as for FIG. 4, that the pipeline stages shown are for illustrative purposes only. In practice, the prefetch and fetch stages form a flow separate from that of the remaining stages.

Figure 5:
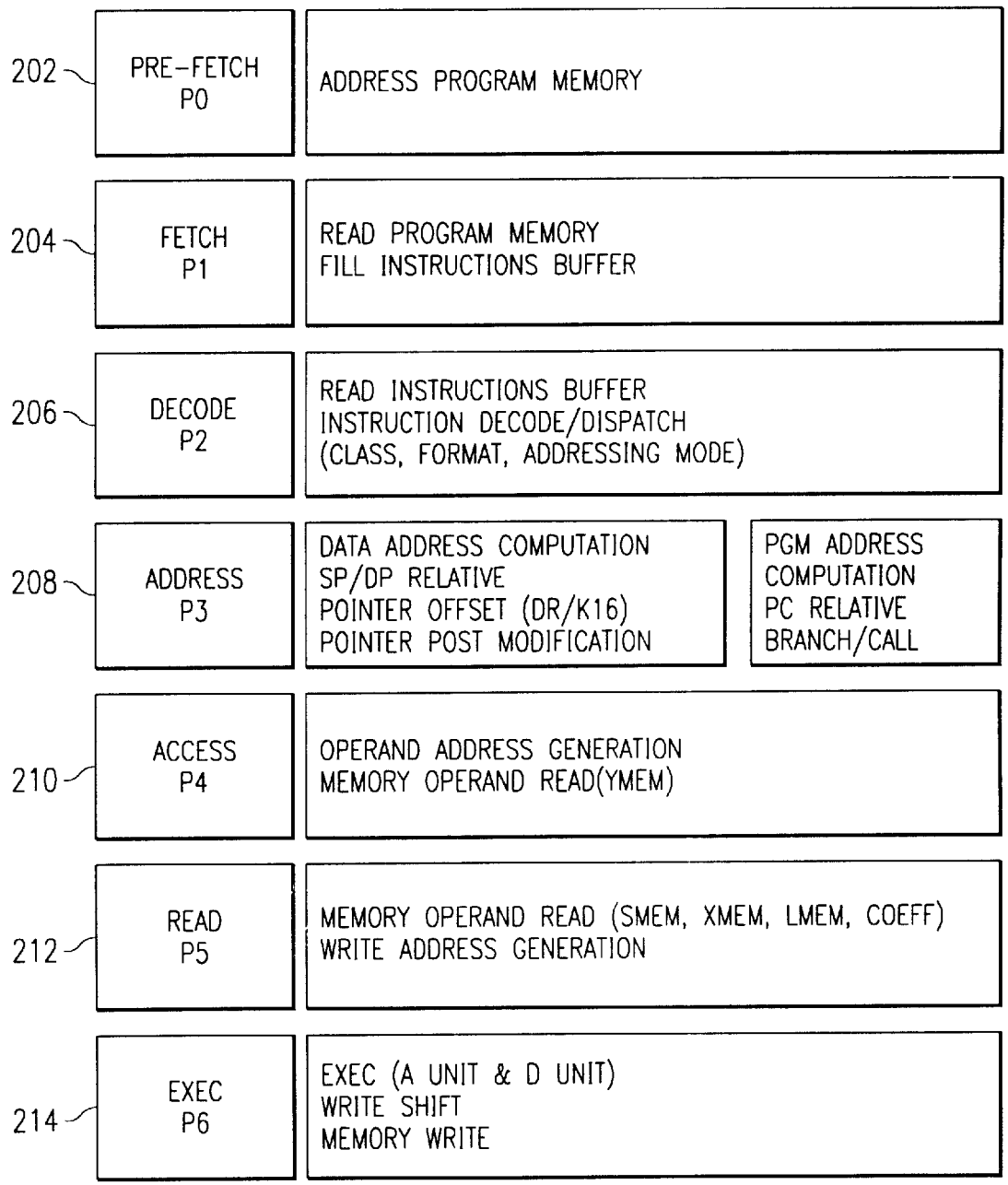
FIG. 5 is a representation of pipeline phases of the processor of FIG. 1.

Comparing FIG. 9 with FIG. 5, P1 represents the fetch stage, P2 the decode stage, P3 the address computation stage, P4 the access stage, P5 the read stage and P6 the execute stage. B represents a coefficient read access from a register via the B bus. C and D represent memory read accesses via the C and D busses respectively. E and F represent write accesses via the E and F busses respectively. In order that the read and write accesses can be performed at the required cycles without causing a bubble (or stall) on the pipeline, decoding is performed as early as possible.

FIG. 10 illustrates a particular form of dual memory access instruction. It is effectively formed from two merged programmed instructions which have implied parallelism. The dual memory instruction of FIG. 10 is termed a soft dual instruction, or also a compound instruction herein. It is formed by combining two programmed single memory access instructions in an instruction preprocessor, for example in a compiler or an assembler. In other words, this compound instruction is not programmed, or preprogrammed, as a dual instruction by a programmer. This provision of this form of compound instruction enables improved memory access performance by permitting parallel operation, with both instructions being executed in the same cycle. In a particular example described in the following, the soft dual instruction is restricted to indirect addressing with dual modifier options. As a result, it is possible to encode the soft dual instruction to achieve increased performance through parallel operation with no size penalty in respect of the combined instruction size.

The soft dual instruction is qualified by a five bit tag field 701, with individual following instruction fields organized as illustrated in FIG. 10. The size of the tag field results from constraints relating to the particular implementation, namely:

that the total encoding format is constrained not be greater than the sum of the encoding formats of the two constituent programmed instructions;

that the total instruction format size is a multiple of 8; and the availability of opcodes with respect to other single instructions.

Following the tag field 701 are:

part 702 of the operation code field for a first instruction;

a compound address field 703/704 including an indirect memory address (XXXMMM) 703 for the first instruction and an indirect memory address (YYYMMM) 704 for a second instruction;

the remainder of the operation code field 705 for the first instruction;

data flow field 706 for the first instruction;

an operation code field 707 for the operation code of the second instruction; and a data flow field 708 for the second instruction.

It can be seen, therefore, that the combined address portion for the soft dual instruction is held at the same location in the soft dual instruction as for any other dual instruction. This provides the advantage of rapid address decoding as a result of being able to commence address decoding without knowledge of the instruction type involved. It will be seen that in order to achieve this, some reorganization of the bits in the soft dual instruction is necessary, for example as described above.

In addition to the modifications described above, where two programmed instructions each comprise a data address generation (DAGEN) field, these could be combined to form a combined DAGEN field in the soft dual instruction. The provision of a combined DAGEN field can facilitate and speed subsequent execution of the soft dual instruction.

Figure 11:
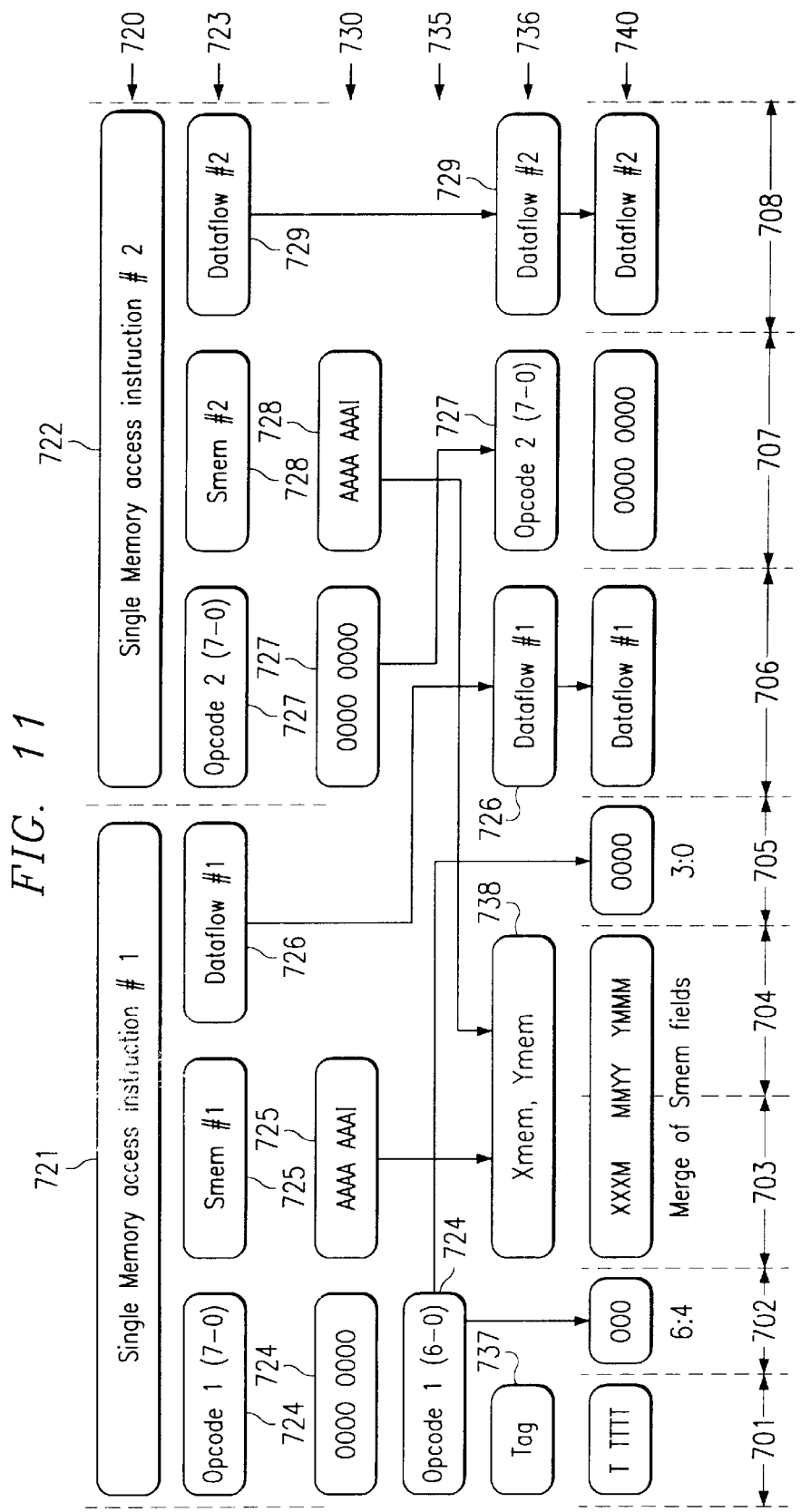
FIG. 11 is a schematic diagram illustrating the generation of a soft dual instruction.
Figure 12:
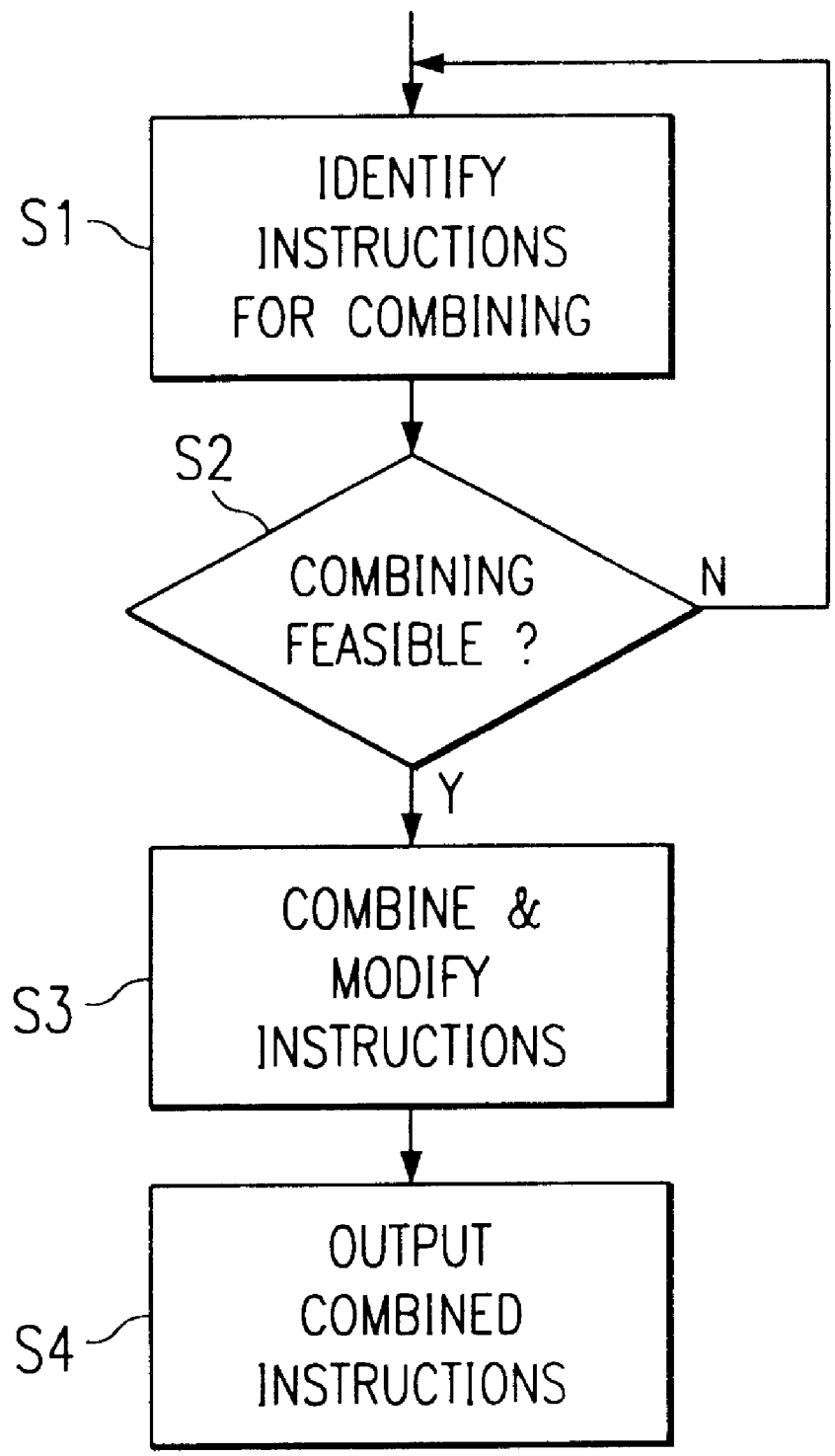
FIG. 12 is a flow diagram of the generation of a soft dual instruction.

FIG. 11 illustrates various steps in transforming two independent instructions into a soft dual instruction.

Two independent instructions 721 and 722 are represented at stage 720.

As shown at 723, a first 24 bit instruction 721 includes an eight bit operation code 724 in the first byte, a single memory (Smem) address 725 in the next byte and data flow bits 726 in the next byte. A second 24 bit instruction 722 includes an eight bit operation code 727 in the first byte, a single memory address 728 in the next byte and data flow bits 729 in the next byte. At 730, the eight operation code bits are each labeled 'O' in the operation code bytes 724 and 727 of each of the instructions. The single memory addresses 725 and 728 are each shown to comprise 7 address bits 'A' plus an indirect/direct indicator bit 'I'. This is because addresses for the standard memory accesses can be either direct or indirect. In the example shown, the granularity is based on bytes. However, in other examples a granularity based on other than 8 bits may be employed. Furthermore, the two instructions do not need to be symmetrical; the first instruction may have a different number of bytes than the second instruction.

At stage 735, the operation code 724 of the first instruction is split into two parts. Only seven of the eight bits of the operation code 724 need to be considered. This is as a result of memory code mapping which can ensure that this is redundant in the case of a soft dual instruction (e.g., by ensuring that all memory instructions have operation codes within a determined range, for example, 80-FF in hexadecimal notation, for a soft dual instruction). As can be seen later in stages 736 and 740, and also in FIG. 10 the operation code for the first instruction is split. Three bits of the operation code for the first instruction are placed between a soft dual instruction tag 737 and the combined addresses 738 for the first and second instructions and four bits are placed after the combined addresses 738.

At stage 736, the insertion of a soft dual instruction tag 737 is shown. This as a tag which can be interpreted by the decoder as representing a soft dual instruction. Also shown is the merging of the single memory fields 725 and 728. This can be achieved because all soft dual instructions are restricted to indirect addresses, whereby an indirect/direct flag is not needed. The indirect addresses are indicated by a three bit base address XXX or YYY, for the first and second instructions, respectively, and a three bit modifier (MMM). Stage 736 further illustrates the moving of the data flow for the first instruction to the first byte position of the second instruction, with the operation code for the second instruction being moved to the second byte position of that instruction.

As a result, the format of the soft dual instruction represented in FIG. 10 is achieved. It is to be noted that there is no code size penalty for a soft dual instruction versus two single memory access instructions. By replacing two single memory (Smem) instructions by an Xmem, Ymem, enough bits are freed up to insert the 'soft dual' tag 701/737. The soft dual tag by itself allows the decoder to detect that it should decode the pair of instructions as memory instructions. Instruction set mapping can be used to ensure that memory instructions are encoded within a window 80-FF, whereby the most significant bit (bit 7) of the first operation code 724 can be discarded when effecting the dual field encoding.

In the example shown, the various stages illustrated in FIG. 11 are performed by an instruction preprocessor, for example a compiler or an assembler, when preparing instructions for execution. The steps performed by the instruction preprocessor are represented in a flow diagram shown in FIG. 12.

In step S1, the instruction preprocessor detects the presence of two instructions which might potentially be combined into a soft dual instruction. In order for this to be possible, the instructions will need to be such that they may be performed in parallel and do not result in data or control flow anomalies. Each instruction within the instruction set is qualified by DAGEN variables in a DAGEN tag, which define the address generator resources and the type of memory access involved to support the instruction.

Accordingly, in step S2, the instruction preprocessor performs a first step in determining the feasibility of merging two standalone memory instructions into a soft dual instruction by analyzing the DAGEN variables. Assuming this checks out, then the instruction preprocessor is operable to analyze potential bus and operator conflicts and to establish whether there is a potential bar to the combining of the first and second instructions.

In step S3, the instruction preprocessor then applies the soft dual instruction tag 737 and modifies the operation codes and address indications, as well as the field positions as illustrated in FIG. 11.

In step S4, the soft dual instruction is output by the instruction preprocessor.

Figure 13:
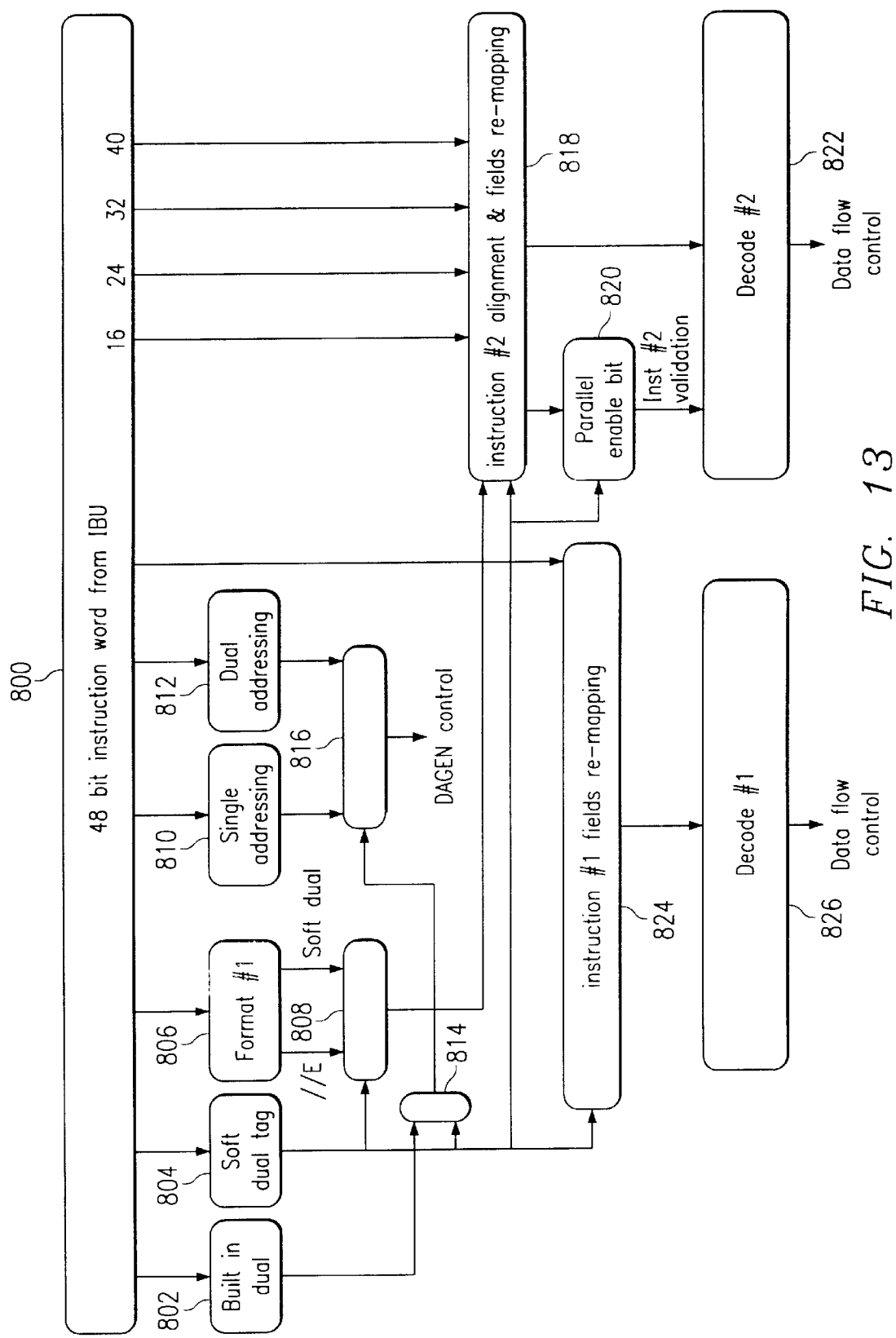
FIG. 13 is a block diagram of a structure for executing a soft dual instruction.

FIG. 13 is a schematic block diagram illustrating the decoding process for a soft dual instruction. FIG. 13 illustrates the decoding of a 48 bit instruction word 800 from the instruction buffer unit 106.

From the operation code (opcode), which is located at the left of the instruction word as shown in FIG. 13, logic 802, 804 in the opcode decoding circuitry is able rapidly to detect whether a built in dual or soft dual instruction is to be decoded. The detection of a soft dual tag by tag decoding logic 804 controls a multiplexor 808 to select either an "E" bit or the soft dual opcodes to be passed from format logic 806 to instruction #2 alignment and remapping logic 818. Single addressing logic 810 and dual addressing logic 812 are operable in parallel to commence decoding of the address fields, which are always located at a determined offset from the left hand end of the instruction. Outputs of dual decoding logic 802 and soft dual tag field decoding logic 804 are combined by logic 814 and form a control input to a multiplexor 816. Thus, when a dual instruction is detected, the output of dual addressing logic 812 is passed to the DAGEN control, otherwise the output of single addressing logic 810 is passed to DAGEN control.

As mentioned above, in an alternative form, a compound instruction can comprise a combined DAGEN code field replacing the separate DAGEN codes of the pair of instructions forming the compound instruction. A DAGEN tag in the compound instruction could identify the presence of the combined DAGEN code field, with the decoder being configured to be responsive to the DAGEN tag to decode the combined DAGEN code field. The combined DAGEN code field could form part of the combined address field. The provision of a combined DAGEN field can provide advantages in execution speed.

If the instruction is a soft dual instruction, then remapping is necessary before decoding can be performed. Accordingly, instruction field remapping logic 824 is responsive to the output of the soft dual tag decoding logic 804 to cause the remapping of the information relating to the first instruction of the pair before passing the remapped operation information to decode logic 826 for the first instruction. Similarly instruction alignment and remapping logic 818 for a second instruction of the instruction pair is responsive to the output of the soft dual tag decoding logic 804 to cause remapping of the information relating to the second memory instruction prior to passing the information to the decode logic 822 for the second instruction. The instruction alignment and field remapping logic 818 is also operable to realign the second instruction dependent upon the format of the first instruction, according to the instruction boundary at bit 16, bit 24, bit 32 or bit 40, as appropriate.

With reference to FIGS. 10 and 13, it can be seen that the decode mechanism shown in FIG. 13 is configured to decode instructions from the instruction buffer. The decode mechanism is responsive to a predetermined tag in a tag field of a soft dual instruction as shown in FIG. 10 to decode a first memory addresses for a first memory instruction and a second memory address for a second memory instruction from a compound address field in the predetermined soft dual instruction.

Parallel enable bit decoding logic 820 is operable to validate whether the second instruction may be decoded and executed in parallel with the first instruction. As a soft dual instruction does not include a parallel enable ("E") bit, this logic 820 is disabled when a soft dual instruction is detected.

Figure 14:
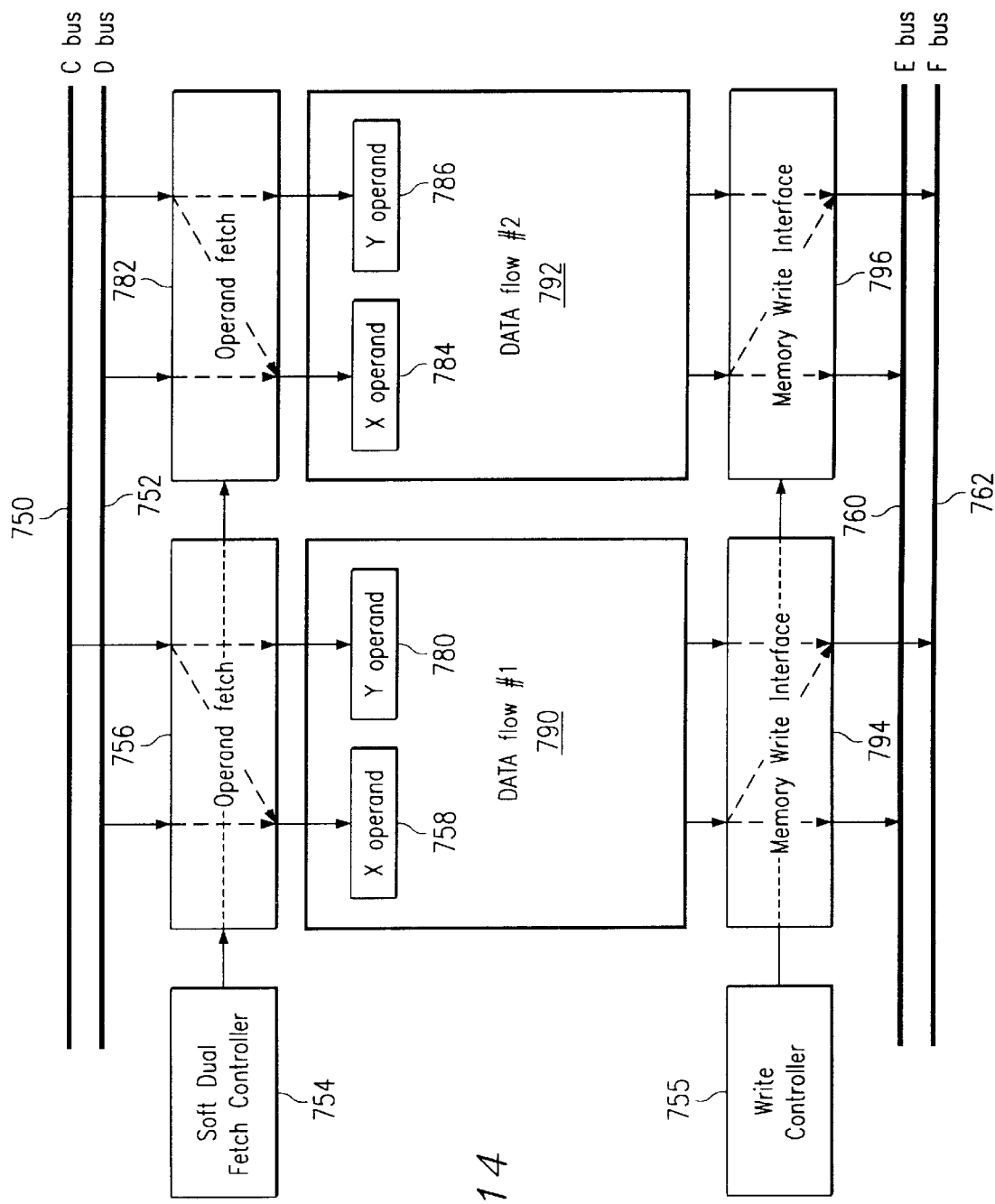
FIG. 14 illustrates memory bus interfacing for a soft dual instruction operation.

FIG. 14 is a schematic block diagram illustrating aspects of the memory bus interfacing for a soft dual instruction, and FIG. 15 is a table summarizing the operand fetch control for a soft dual instruction.

FIG. 14 illustrates the C bus 750, the D bus 752, the E bus 760 and the F bus 762, which busses were referenced earlier, but were not individually identified.

A soft dual fetch controller 754 forms part of the instruction control functions of the processor core 102. This is operable to control operand fetch mechanisms 756 and 782 to fetch X and Y operands 758 and 780 for a first data flow path 790, and X and Y operands 784 and 786 for a second data flow path 792, respectively, via the C and D busses 750 and 752. A soft dual write controller 755, which also forms part of the instruction control functions of the processor core 102, is operable to control memory write interfaces 794 and 796 to control the writing of operands from the first data flow path 790 and the second data flow path 792, respectively to the E and F busses 760 and 762.

The table which forms FIG. 15 illustrates the operand fetch and write control operations performed by the soft dual fetch controller 754 and by dual write controller 755. This illustrates the changes to the operand fetch flow for a soft dual memory instruction compared to a single memory instruction performed standalone. Thus, when a single memory instruction is executed standalone, the operand register is loaded from the D bus, whereby the memory request is a D request, thereby requiring two cycles. However, when a soft dual instruction is executed, the fetch controller changes the operand fetch flow for the Ymem path, such that the request is re-directed to a C request and the operand is fetched from the C bus instead of the D bus as indicated at 1500. Advantageously, operand #1 and operand #2 are fetched in parallel in the same cycle. The same mechanism applies to the write interface. For example, an E bus request can be redirected to an F bus request as indicated at 1502.

In order to avoid conflict between instructions executed in parallel, it is necessary to have rules for parallel execution. An embodiment of the invention employs parallelism rules to avoid conflict for access to processing engine resources.

Instructions are defined by: one or more source operands; one or more operators; one or more destination operands and internal and external busses.

Examples of source and/or destination operand (s) are:

A-Unit registers (ARx, DRx, STx, (S)SP, CDP, BKxx, BOFxx, MDPxx, DP, PDP, CSR)

D-Unit registers (ACx, TRNx)

P-Unit Control registers (BRCx, BRS 1, RPTC, REA, RSA, IMR, IFR, PMST, DBIER, IVPD, IVPH)

Memory operands (memory locations or memory mapped registers)

a constant

Examples of operator(s) are listed in Table 1.

TABLE 1

| | Operations | |
|---|---|---|
| A Units | D Units | P Units |
| A-Unit ALU | D-Unit ALU | P-Unit control flow operators |

TABLE 1-continued

Operations

| A Units | D Units | P Units |
|---|---|---|
| A-Unit swap | D-Unit shifter | P-Unit load |
| A-Unit load | D-Unit exponent | P-Unit store |
| A-Unit store | D-Unit bit field extract | |
| A-Unit DAGEN X | D-Unit bit count | |
| A-Unit DAGEN Y | D-Unit DMAC | |
| A-Unit DAGEN Coeff | D-Unit swap | |
| | D-Unit load | |
| | D-Unit store | |

Examples of the busses are: Memory Read busses; Memory Write busses; D-Unit busses; A-Unit busses and Cross Unit busses.

Table 2 describes the busses which are shown in FIG. 3 in more detail.

TABLE 2

Busses

| Busname | Width | Definition |
|---|---|---|
| ACR0, ACR1 | 40 | D-Unit read busses. |
| ACW0, ACW1 | 40 | D-Unit write busses. |
| EFC | 16 | D-Unit bus from Shifter to Register-File for Expand Field and Count operations. |
| SH | 40 | D-Unit bus from Shifter to ALU. |
| BB | 16 | Coefficient read from different memory bank than CB, DB. |
| CB, DB | 16 | Operands read from memory. |
| EB, FB | 16 | Data to be written in memory. |
| KAB | 16 | Constant bus used in address phase by A-Unit and P-unit. |
| KDB | 16 | Constant bus used in exec. Phase by A-Unit or D-Unit. |
| ACB | 24 | Bus coming from ACx accumulators to A-Unit or P-Unit. |
| DRB | 16 | Bus coming from DRx registers to D-Unit operators. |
| DR2 | 16 | Bus coming from DR2 register to Shifter for implied shift. |
| RGA | 16 | DAx operand #1 from A-Unit Register-File. |
| RGB | 16 | DAx operand #2 from A-Unit Register-File. |
| RGD | 16 | ALU16 result return to A-Unit Register-File, also connected to P-unit. |
| CSR | 16 | Bus coming from A-Unit Register-File to I-Unit. |

Figure 16:
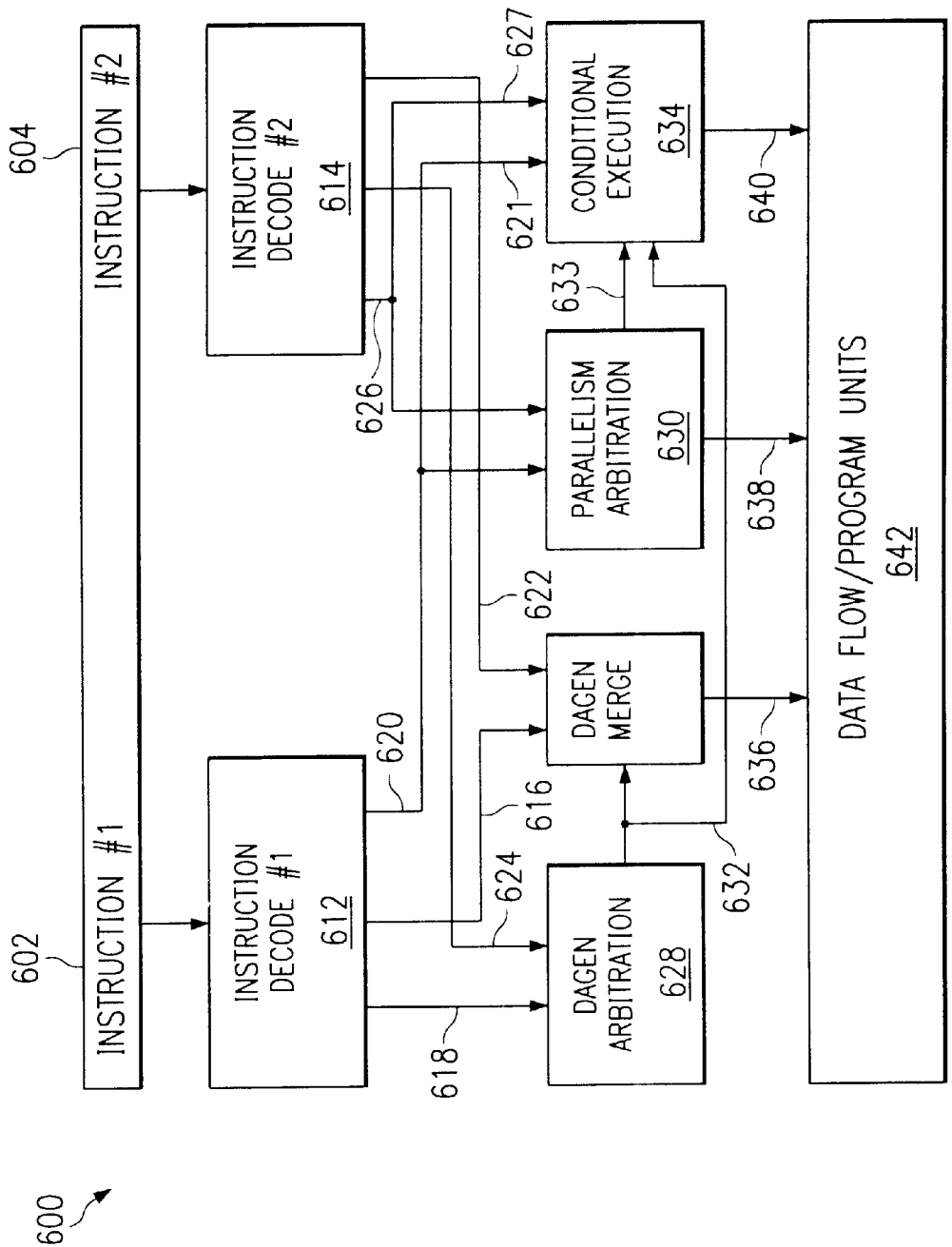
FIG. 16 is a schematic block diagram illustrating a mechanism for decoding instructions.

FIG. 16 is a schematic block diagram illustrating a mechanism 600 for decoding instructions including decoding the rules for controlling parallelism. The hardware will now be described with a summary of the rules for parallelism. A more detailed example of a set of parallelism rules then follows.

FIG. 16 illustrates two instructions 602 and 604 extracted from the instruction buffer queue 502. The instruction decoding mechanism provides decoding of the first and second instructions 602 and 604 and verification of the parallelism of the instructions. It also generates signals to be provided to the A-unit 110, the D-unit 112 and the P-unit 108 control, or operating flows, as represented by the data flow/programming flow unit 642 in FIG. 16.

The first and second instruction decoders 612 and 614, which correspond to the instruction decoders 826 and 822, respectively, of FIG. 13, enable separate decoding of the first and second instructions 602 and 604. A set of control signals is generated for each flow from the two instructions.

From first instruction decoder 612, one or more first control signal(s) 616 indicate(s) the Data Address GENeration mode (DAGEN_1) associated with the first instruction. A second control signal (V) 618 is a validity bit indicating if this addressing mode is valid or not for the first instruction position. One or more third signal(s) 620 indicate(s) which busses internal to the processing engine, which of the A Unit and D unit ALUs, MAC(s), shifters and register files and which operators are used to execute the instruction. Conditional instructions give rise to condition signals which are output at 621 to a conditional execution unit 634.

From second instruction decoder 614, one or more first control signal(s) 622 indicate(s) the DAGEN mode (DAGEN_2) associated with the second instruction. A second control signal (V) 624 is a validity bit indicating if this addressing mode is valid or not for the second instruction position. One or more third signal(s) 626 indicate(s) which busses internal to the processing engine, which of the A Unit and D unit ALUs, MAC(s), shifters and register files and which operators are used to execute the instruction. Conditional instructions give rise to condition signals which are output at 627 to a conditional execution unit 634.

The third signals 620 and 626 from the first and second instruction decoders 612 and 614 are supplied to a parallelism arbitration and merge unit 630.

The validity signals (V) 618 and 624 and the DAGEN mode control signals 616 and 622 from the first and second instruction decoders 612 and 614 are supplied to a DAGEN mode arbitration unit 628.

The DAGEN mode arbitration unit 628 includes DAGEN arbitration logic for checking DAGEN mode compatibility in accordance with the parallelism rules. Incompatible DAGEN_1 and DAGEN_2 modes are rejected and cause the output of a false condition signal 632 to a conditional execution unit 640. The conditional execution unit responds to the false condition signal to modify or inhibit the effect of the DAGEN mode signals and the execution of the two instructions, for example by modifying the instructions to a No Operation (NOP).

Some DAGEN mode combinations may not be supported in order to reduce design complexity of the DAGEN connections to the memory busses and to simplify the DAGEN merge operations to be performed and also because of memory bus conflicts. In some cases, a compiler can be operable to swap the order of instructions so that all combinations do not need to be supported. Thus, in the present example, some DAGEN modes are not supported as is set out in FIG. 17.

Incompatible resource requirements from instructions 1 and 2 are rejected and these instructions are modified, for example, to a No Operation (NOP). This is true, for example where two instructions require the same operators, A/D unit ALU, MAC, SHIFTER and register files. In the case of two instructions which require the same internal bus or busses, one of the instruction has priority over the other one for bus accesses. Instruction 1 is arranged to win access to internal busses over instruction 2 when a conflict occurs. This enables an increase in the speed of parallelism checking in the decode stage of the pipeline. This is because one of the instructions is modified to operate 'smoothly' without collision with respect to the other instruction in the succeeding stages of the pipeline. This type of refinement enables a reduction in decoder stage tasks (speed path) and enables use of instructions which partly share the same resources. An example of this is the sharing of constant values, with the updating of status bits from the first instruction only.

The DAGEN mode control signals 616 and 622 from the two instruction flows enable the DAGEN unit 32 of FIG. 3 to select the correct input registers, to select the correct operations to perform and to select the correct destination registers. The DAGEN mode control signals 616 and 622 can be passed directly to the DAGEN unit 32 via path 636, or can first be merged by the DAGEN mode arbitration 628. The DAGEN arbitration unit 628 can thus provide DAGEN output signals on path 636 from the signals 616 and 622 input thereto in accordance with the parallelism, with the DAGEN output signals being inhibited or invalidated where invalid DAGEN mode combinations are detected.

The parallelism arbitration unit 630 includes parallelism arbitration logic for arbitrating between the resource control signals to detect invalid combinations of resource control signals. For example, the parallelism arbitration unit tracks operators. If the same operator issues twice in an instruction pair, then the parallelism arbitration unit invalidates the instruction pair. This is done by outputting a false condition signal 633 to the conditional execution unit 634. The conditional execution unit responds to the false condition signal to modify or inhibit the effect of the resource control signals and the execution of the two instructions, for example by inhibiting updating of one or both of the destination registers for the operations to be performed by the instructions.

The parallelism arbitration unit 630 outputs the resource control 620 and 626 input via path 638. The parallelism arbitration unit can optionally be operable to merge and/or modify the resource control signals 620 and 626 prior to being output. Thus, for example, where a bus resource conflict is detected, the parallelism arbitration unit can be operable to control an order of access for the first and second instructions to a common bus resource, for example by modifying an order of instructions according to the parallelism rules.

The resource control signals output at 638 from the parallelism arbitration unit 630 are supplied to elements of the A-Unit 110 (including the ALU 34 and the A-Unit register file 30), the D-Unit (including the D-Unit ALU 38, the D-Unit MACs 42 and 44, the D unit shifter 40 and the D-Unit register file 36), and the P-Unit 108 of FIG. 3. These control output signals enable these various elements to select the correct input registers, to select the correct operations to perform and to select the correct destination registers.

In summary, the parallelism decoder mechanism provides a concentration of two symmetrical instruction decoder paths, followed by a merging of the two instruction control signals paths with 'smooth' rejection of an illegal instruction pair in accordance with, for example, the parallelism rules as described below and the dispatching of control signals to the operative units concerned. The conditional execution unit inhibits, modifies or enables execution of the instructions dependent upon the parallelism rules.

To illustrate the application of parallelism rules, an example of a set of such rules is set out below:
Rule 0
Parallelism between two instructions is allowed if all the rules are respected.
Rule 1
Two instructions can be put in parallel if the total length of the parallel instructions does not exceed 48 bits and instruction#2 has the parallel enable bit active.
Rule 2
The following addressing modifiers do not allow the parallelism:
*ARn(#K)
*+ARn(#K)
*CDP(#K)
*+CDP(#K)
*ABS 16(#K)
*#K
*port(#K)

Rule 3
A soft-dual instructions resulting from a combination of memory accesses is not allowed, and is not executed, but is replaced by two parallel "NOP" instructions. No binary code correction is effected.

FIG. 17 sets out DAGEN parallelism rules implemented by the instruction decoders 612 and 614 of FIG. 16 and the DAGEN arbitration and merge units 628 and 632. The syntax for the table shown in FIG. 17, is as follows:
'-' Not supported in this example (but possibly in another example), to be rejected by the assembler
'E' Supported via the parallel enable bit
'S' Supported via a soft dual scheme
'*' Instruction pair not supported by hardware in the illustrated example In the case of the instruction pairs identified by the asterisk, the instruction pair may not be supported to simplify the hardware required and/or to reduce silicon size and/or because instruction inversion can be effected prior to execution by the compiler. In other embodiments, at least some of these instruction pairs could be supported by the hardware.

In FIG. 17, the rows represent the DAGEN mode for instruction number 1 and the columns represent the DAGEN mode for instruction number 2.

The comparison of valid and invalid DAGEN modes from FIG. 16 is illustrated in the following examples.

$Smem=DR2//AC2=Smem$  Example 1

This equates to a combination of an Smem write with an Smem read (Smem_W//Smem_R), that is a "dual-WR" ("dual write/read"). This is an unknown DAGEN mode. Accordingly, this combination of instruction should be arranged as AC2=Smem//Smem=DR2, which is supported by the hardware of the present embodiment and will generate a known DAGEN mode called Dual-RW (dual read/write).

$AC1=DR2//Smem=DR3$  Example 2

If only one instruction needs an address generation then this instruction is in the first position. Accordingly, this instruction pair should be arranged as:

$Smem=DR3//AC1=DR2$

The instruction decode mechanism 600 tracks the DAGEN class of both instructions and determines if they fall on the group supported by the soft dual scheme.

If $(DAGEN-1) and $(DAGEN-2) fall on the subset supported by the soft dual scheme then:
$(DAGEN_12) is computed in order to define the DAGEN class of the soft dual instruction and the two original instructions are executed in parallel.

If $(DAGEN_1) or $(DAGEN-2) does not fall on the subset supported by the soft dual scheme then:

$(DAGEN-12)<-NO-DAG

No post-modification is performed for both X & Y pointers.

When the instruction pair is discarded, forcing a false condition, a false condition signal is supplied to the conditional execution unit 634 as has been described earlier.

FIG. 18 illustrates the operator parallelism rules in more detail as implemented by the parallelism arbitration unit 630. The syntax for FIG. 18 is:
'-' Not supported in this example (but possibly in another example)
'X' Supported via the parallel enable bit or the soft dual scheme It should be noted that any load or store instruction can be performed in parallel with any other instruction. Shift and store instructions use the D Unit shifter.

Table 3 list represents port( ) qualifier rules:

TABLE 3

Port () Qualifier Rules

| | | | |
|---|---|---|---|
| Smem read | \|\| | readport() -> | Valid syntax |
| Smem read | \|\| | writeport() -> | Flagged as an error |
| Smem write | \|\| | writeport() -> | Valid syntax |
| Smem write | \|\| | readport() -> | Flagged as an error |
| Dual read | \|\| | readport() -> | Xmem defines peripheral address |
| Dual read | \|\| | writeport() -> | Flagged as an error, writeport() seen as a NOP |
| Dual write | \|\| | writeport() -> | Ymem defines peripheral address |
| Dual write | \|\| | readport() -> | Flagged as an error, readport() seen as a NOP |
| Smem R/W | \|\| | readport() -> | Valid syntax |
| Smem R/W | \|\| | writeport() -> | Valid syntax |
| Lmem | \|\| | readport() -> | Flagged as an error |
| Lmem | \|\| | writeport() -> | Flagged as an error |
| Ymem = Xmem | \|\| | readport() -> | Xmem defines peripheral address |
| Ymem = Xmem | \|\| | writeport() -> | Ymem defines peripheral address |
| delay(Smem) | \|\| | readport() -> | Flagged as an error, executed as Smem R/W |
| delay(Smem) | \|\| | writeport() -> | Flagged as an error, executed as Smem R/W |
| Smem write + shift | \|\| | writeport() -> | Flagged as an error (F bus) |
| Lmem write + shift | \|\| | writeport() -> | Flagged as an error (F bus) |

It should be noted that qualifiers are always in the second position.

Rule 4

Parallelism Rules within the A-Unit

In the present embodiment, there are four types of operations within the A-Unit: Swap operations; ALU operations; Load operations and Store operations.

In this embodiment, parallelism is supported within the A-Unit for the instruction pairs:

Load//Swap

Load//ALU

Load//Store

Load(simple)//Load(simple)

Store//Swap

Store//ALU

Store(simple)//Store(simple)

ALU//Swap

If there are more than 2 loads, then the pair of instructions is replaced by two parallel NOP instructions.

Rule 5

Parallelism Rules within the D-Unit

In the present embodiment, there are five types of operations within the D-Unit: Swap operations; ALU/MAC/ SHIFT operations; Load operations; Store operations and Shift Store operations.

In this embodiment, parallelism is supported within the D-Unit for the following instruction pairs:

Load//Swap

Load//ALU or MAC or SHIFT

Load//Store

Load//Shift Store

Load(simple)//Load(simple)

Store//Swap

Shift Store//Swap

Store//ALU or MAC or SHIFT

Shift Store//ALU or MAC

Store(simple)//Store(simple)

Store(simple)//Shift Store

ALU or MAC or SHIFT//Swap

If there are more than 2 loads, the pair of instruction is replaced by two parallel NOP instructions.

In other embodiments, further parallelism may be supported, for example, for ALU//MAC instructions, shift// ALU instructions, shift//MAC instructions, MAC//Mac instructions, and so on.

Rule 6

Parallelism Rules within the P-Unit

There are three types of operations within the P-Unit: Control Flow operations; Load operations and Store operations. Examples of each are listed in Table 4.

TABLE 4

Examples of Operations.

| | |
|---|---|
| Control Flow Operations | IF () GOTO / CALL / RETURN |
| | GOTO / CALL / RETURN |
| | INTR / TRAP / RESET / IDLE |
| | REPEAT / BLOCKREPEAT / LOCAL REPEAT / |
| | WHILE REPEAT |
| | RETURN FROM INTERRUPT |
| | SWITCH |
| | IF () EXECUTE |
| Load Operations | BRCx = kl2 |
| | BRCx = Smem |
| | LCRPC = dbl(Lmem) |
| | BRCx = DAx |
| Store Operations | DAx = BRCx |
| | DAx = RPTC |
| | dbl(Lmem) = LCRPC |
| | Smem = BRCx |

Parallelism is supported in the P-Unit for the following instruction pairs:

Control Flow operation//Load

Control Flow operation//Store

Load//Store

Load (simple)//Load(simple)

Store(simple)//Store(simple)

Rule 7

A memory mapped access takes precedence over a data register access. For example:

Smem=*K16*//*AC0=AC0+DR3*

Smem is an MMR (memory mapped register) access on an AC0 register. In such a case a 16 bit field of the AC0 will be updated by the instruction Smem=K16, and AC0=AC0+ DR3 will not be performed. However this instruction can have the effect of updating an appropriate status bit. The other AC0 fields are not affected.

Rule 8

If a standalone instruction has two identical destinations then priority is given to the second one. Examples of this are:

dst1, dst2=pop( ) with dst1=dst2=AC1    Example 1 becomes: dst2=pop( ) with SP=SP−2.

max_diff(AC1, AC2, AC3, AC3)    Example 2

Only the following will be executed:

HI(AC3)=HI(AC2)−HI(AC1)

LO(AC3)=LO(AC2)−LO(AC1)

Rule 9

If there is a destination conflict between two parallel instructions then instruction number 2 overwrites instruction number 1. This is the same for status bits. An example of this is:

$$AC1=AC1+AC3//AC1=k4$$

Only the following will be executed: AC1=k4

Rule 10

Rule 10 is an exception of Rule 9. If instruction number 1 uses the DAGEN and instruction number 2 is an A-Unit swap operation, there can be a destination conflict. In such a case DAGEN overwrites the swap operation.

Rule 11

If there is a constant conflict, due to a bus resource shared between two parallel instructions, then the constant of instruction number 2 will overwrite the constant of instruction number 1. An example of this is:

$$AC1=AC1+k4//DR2=K16$$

becomes: AC1=AC1+K16//DR2=K16,
and AC1=AC1+K16 is performed as AC1=AC1+k4 but with the K16 value.

The architecture is arranged around two constants busses which can be used per parallel instructions pair. These comprise: one in the address phase of the pipeline, as used by the DAGENx (KAB bus) and by the P-unit; and one in the execute phase of the pipeline, as used by other A-Unit operators and the D Unit (KDB bus).

Rule 12

Move operations from register to register use the ALU of the A-Unit or D-Unit (in a "bypass" mode) depending on where the destination is located. Examples of this are:

AC1=DR2 is performed using the D-Unit ALU

DR2=AC1 is performed using the A-Unit ALU

Rule 13

Overwrite priority for the DAGEN.

If there is a write conflict between two DAGEN operators, then the overwrite mechanism is executed as below:

DAGEN X overwrites DAGEN Y (conflict between DAGEN operators X and Y).

DAGEN X overwrites DAGEN Coefficient (conflict between DAGEN operators X and Coefficient).

DAGEN Y overwrites DAGEN Coefficient (conflict between DAGEN operators Y and Coefficient).

Rule 14

Instructions like Ymem=Xmem or Smem=K16 use a D-Unit dedicated path.

Rule 15

Two instructions can be in parallel if one of them is a mono-dispatch instruction. Otherwise, the pair of instruction is replaced by two parallel NOP instructions.

Rule 16

An IDLE instruction does not support any instruction in parallel.

In the above, although a specific set of rules has been described, it will be appreciated that in other embodiments another set of rules may be developed to all different types and/or combinations of parallel operation.

Thus, there has been described an example of a set of parallelism rules which are employed in the instruction decode mechanism of FIG. 16.

Figure 19:
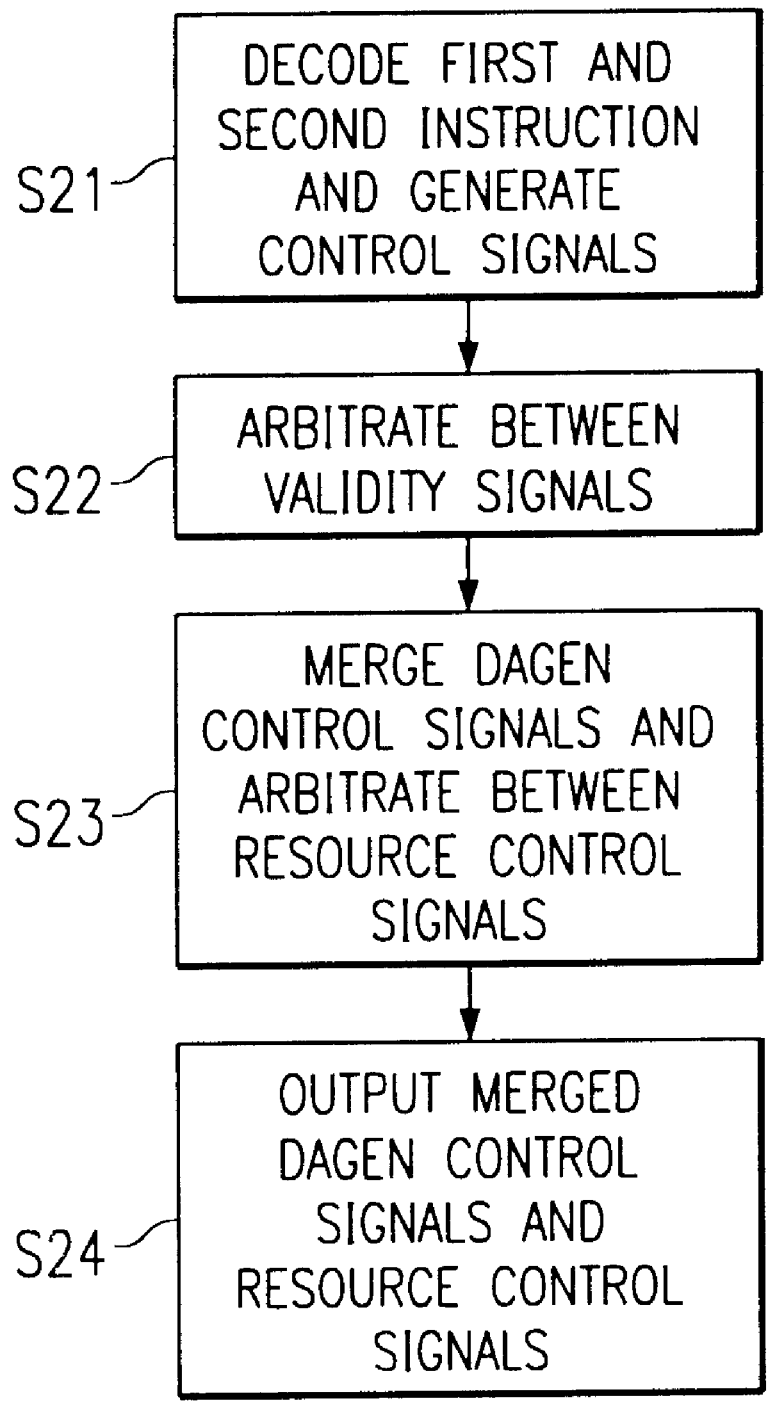
FIG. 19 is a flow diagram illustrating a method for decoding instructions.

FIG. 19 is a flow diagram illustrating a method of decoding instructions enabling implementation of the parallelism rules.

In step S21, two instructions from a pipeline stage are decoded in respective first and second decoder logic 602 and 604 (see FIG. 16), including the generation of instruction control signals with a DAGEN validity bit, DAGEN mode signals and resource control signals.

In step S22, arbitration between the DAGEN validity signals and/or the DAGEN mode control signals is performed in a DAGEN arbitration logic 628 (see FIG. 16). A false condition signal is output to the conditional execution unit 634 on the detection of an invalid DAGEN mode signal combination in order to provide 'smooth' rejection of illegal instruction pairs according to the parallelism rules.

At the same time, in step S23, arbitration between resource control signals is performed in the parallel arbitration logic 630. A false condition signal is output to the conditional execution unit 634 on detecting an invalid resource control signal combination in order to provide 'smooth' rejection of illegal instruction pairs according to the parallelism rules.

In step S24, DAGEN mode control signals are output at 636 by the DAGEN arbitration unit for controlling the A-Unit DAGEN 32. Resource control signals are also output at 638 by the parallelism arbitration logic 630 for controlling the P-Unit 108, the A-Unit 110 and the D-unit, 112 and bus accesses in the processing engine. The effect of these signals can be modified, inhibited or replaced by further control signals output at 640 by the conditional execution unit 634 in response to a false condition signal from the DAGEN mode arbitration unit 628 or the parallelism arbitration unit 630.

Figure 20:
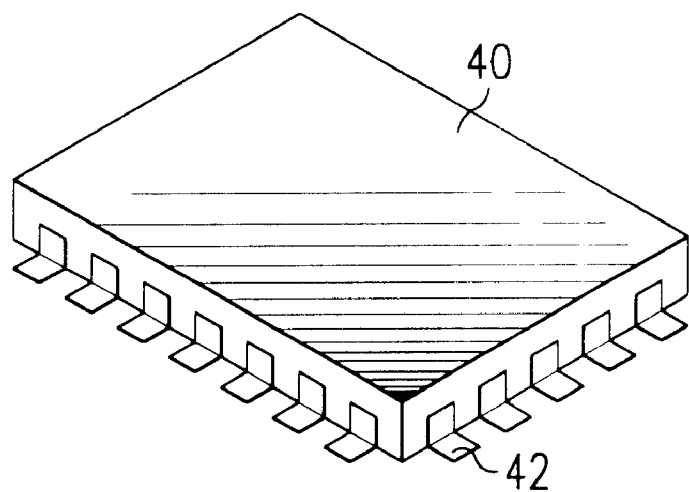
FIG. 20 is a schematic representation of an integrated circuit incorporating the processor of FIG. 1.

FIG. 20 is a schematic representation of an integrated circuit 40 incorporating the processor 10 of FIG. 1. The integrated circuit can be implemented using application specific integrated circuit (ASIC) technology. As shown, the integrated circuit includes a plurality of contacts 42 for surface mounting. However, the integrated circuit could include other configurations, for example a plurality of pins on a lower surface of the circuit for mounting in a zero insertion force socket, or indeed any other suitable configuration.

Figure 21:
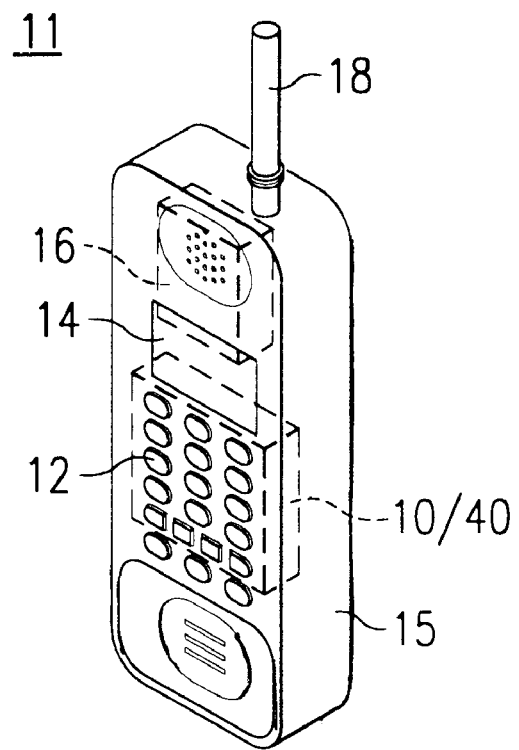
FIG. 21 is a schematic representation of a telecommunications device incorporating the processor of FIG. 1.

One application for a processing engine such as the processor 10, for example as incorporated in an integrated circuit as in FIG. 20, is in a telecommunications device, for example a mobile wireless telecommunications device. FIG. 21 illustrates one example of such a telecommunications device. In the specific example illustrated in FIG. 21, the telecommunications device is a mobile telephone 11 with integrated user input device such as a keypad, or keyboard 12 and a display 14. The display could be implemented using appropriate technology, as, for example, a liquid crystal display or a TFT display. The processor 10 is connected to the keypad 12, where appropriate via a keyboard adapter (not shown), to the display 14, where appropriate via a display adapter (not shown), and to a telecommunications interface or transceiver 16, for example a wireless telecommunications interface including radio frequency (RF) circuitry. The radio frequency circuitry could be incorporated into, or separate from, an integrated circuit 40 comprising the processor 10. The RF circuitry 16 is connected to an aerial 18.

Thus, there has been described a processing engine which provides parallelism rules for parallel execution of instructions. Using parallel execution can reduce power consumption by the processing engine. Using the parallelism rules enables robust and predictable parallel execution of instructions. Restricting the range of instruction combinations in accordance with the rules enables optimization of the hardware, reducing redundancy. For example, a decoder for a second instruction can be a subset of the decoder for a first instruction resulting in efficient use of silicon real estate and providing further opportunities for a reduction in power consumption. Providing decoder hardware responsive to the parallelism rules enables automatic verification of the validity of parallelism, and can avoid resource conflicts at runtime. Systematic debugging also becomes possible.

It will be appreciated that although particular embodiments of the invention have been described, many modifications/additions and/or substitutions may be made within the scope of the present invention. In particular, the invention has been described in the context of a particular processing engine architecture with a particular set of parallelism rules. It will be appreciated that the invention can equally be applied to other architectures and sets of rules.

As used herein, the terms "applied," "connected," and "connection" mean electrically connected, including where additional elements may be in the electrical connection path.

While the invention has been described with reference to illustrative embodiments, this description is not intended to be construed in a limiting sense. Various other embodiments of the invention will be apparent to persons skilled in the art upon reference to this description. It is therefore contemplated that the appended claims will cover any such modifications of the embodiments as fall within the true scope and spirit of the invention.

What is claimed is:

1. A digital system with a processing engine for executing instructions in parallel, the system comprising:
    a memory for holding a program for execution by the processor, wherein the program includes at least one set of instructions pre-coded for parallel execution of all instructions in each set in parallel, each set of instructions pre-coded in parallel including at least two instructions;
    an instruction buffer for holding a set of instructions pre-coded for parallel execution with a first instruction in a first position and a second instruction in a second position;
    a first decoder for decoding the first instruction and generating first control signals;
    a second decoder for decoding the second instruction and generating second control signals; and
    arbitration logic for arbitrating between the first and second control signals for controlling parallel execution of the instructions in accordance with a set of parallelism rules such that if at least one of the parallelism rules is violated indicating the set of instructions were erroneously pre-coded for parallel execution then the set of instructions are not executed in parallel.

2. The processing engine according to claim 1, wherein the first control signals include a first validity signal indicative of the validity of the first instruction in the first position, the second control signals include a second validity signal indicative of the validity of the second instruction in the second position, and the arbitration logic comprises data address generation control signal arbitration logic for arbitrating between the first and second validity signals.

3. The processing engine according to claim 1, wherein the first control signals comprise at least one first data address generation control signal, the second control signals comprise at least one second data address generation control signal and the arbitration logic comprises data address generation control signal arbitration logic for arbitrating between the first and second data address generation control signals according to the set of parallelism rules.

4. The processing engine according to claim 3, wherein the first control signals further include a first validity signal indicative of the validity of the first instruction in the first position, the second control signals include a second validity signal indicative of the validity of the second instruction in the second position, and the data generation control signal arbitration logic is further operable to arbitrate between the first and second validity signals.

5. The processing engine according to claim 4, wherein the data address generation control signal arbitration logic is operable selectively to cause inhibiting and/or modifying of the effect of the data address generation control signals dependent upon the result of the data address generation control signal arbitration, such that at least the second instruction is effectively non-operational.

6. The processing engine according to claim 5, comprising a conditional execution unit, the data address generation control signal arbitration logic being operable to generate a false condition signal in response to detection of a data address generation control signal combination which is invalid in accordance with the parallelism rules, the conditional execution unit being responsive to the false condition signal to inhibit and/or modify application of the data address generation control signals.

7. The processing engine according to claim 6, comprising data address generation control signal merge logic for generating merged data address generation control signals from the first and second data address generation control signals.

8. The processing engine according to claim 7, comprising a data address generating unit responsive to the address generating control signals.

9. The processing engine according to claim 1, wherein the first control signals comprise at least one first resource control signal, the second control signals comprise at least one second resource control signal, and the arbitration logic comprises resource control signal arbitration logic for arbitrating between the first and second resource control signals according to the parallelism rules.

10. The processing engine according to claim 9, wherein the resource control signal arbitration logic is operable selectively to cause inhibiting and/or modifying of the effect of the resource control signals dependent upon the result of the resource control signal arbitration, such that at least the second instruction is effectively non-operational.

11. The processing engine according to claim 10, comprising a conditional execution unit, the resource control signal arbitration logic being operable to generate a false condition signal in response to detection of a resource control signal combination which is invalid in accordance with the parallelism rules, the conditional execution unit being responsive to the false condition signal to inhibit and/or modify the effect of the resource control signals.

12. The processing engine according to claim 11, comprising resource control signal merge logic for generating merged resource signals from the first and second resource control signals.

13. A method of executing instructions in parallel in a processing engine, which processing engine comprises a program memory storing at least one set of instructions pre-coded for parallel execution of all instructions in each set in parallel, each set of instructions pre-coded in parallel including at least two instructions, an instruction buffer for holding a set of instructions pre-coded for parallel execution with a first instruction in a first position and a second instruction in a second position, the method comprising the steps of:

a) fetching the at least two instructions pre-coded for parallel execution from the program memory into the instruction buffer for execution by the processing engine;

b) decoding the first instruction and generating first control signals;

c) decoding the second instruction and generating second control signals; and d) arbitrating between the first and second control signals for controlling parallel execution of the instructions in accordance with a set of parallelism rules, such that execution of at least the second instruction is completely inhibited when the arbitration determines one or more of the set of parallelism rules is violated indicating the set of instructions were erroneously pre-coded for parallel execution.

14. The method according to claim 13, wherein the first control signals include a first validity signal indicative of the validity of the first instruction in the first position, the second control signals include a second validity signal indicative of the validity of the second instruction in the second position, and wherein step (d) comprises arbitrating between the first and second validity signals.

15. The method according to claim 13, wherein the first control signals comprise at least one first data address generation control signal, the second control signals comprise at least one second data address generation control signal, and wherein step (d) comprises arbitrating between the first and second data address generation control signals according to the set of parallelism rules.

16. The method according to claim 13, wherein the first control signals further include a first validity signal indicative of the validity of the first instruction in the first position, the second control signals include a second validity signal indicative of the validity of the second instruction in the second position, and wherein step (d) further comprises arbitrating between the first and second validity signals.

17. The method according to claim 16, wherein step (d) further comprises selectively inhibiting and or modifying the effect of the data address generation control signals dependent upon the result of the data address generation control signal arbitration.

18. The method according to claim 17, wherein step (d) further comprises:

generating a false condition signal in response to detection of a data address generation control signal combination which is invalid in accordance with the parallelism rules, a conditional execution unit being responsive to the false condition to inhibit and/or modify application of the data address generation control signals.

19. The method according to claim 18, further comprising the step of generating merged data address generation control signals from the first and second data address generation control signals.

20. The method according to claim 13, wherein the first control signals comprise at least one first resource control signal, the second control signals comprise at least one second resource control signal, and wherein step (d) comprises arbitrating between the first and second resource control signals according to the parallelism rules.

21. The method according to claim 20, wherein step (d) further comprises selectively inhibiting and/or modifying of the effect of the resource control signals dependent upon the result of the resource control signal arbitration.

22. The method according to claim 21, wherein step (d) further comprises generating a false condition signal in response to detection of a resource control signal combination which is invalid in accordance with the parallelism rules, a conditional execution unit being responsive to the false condition to inhibit and/or modify application of the data resource control signals.

23. The method according to claim 22, further comprising the step of generating merged resource control signals from the first and second resource control signals.

24. A method of executing instructions in parallel in a processing engine, the method comprising the steps of:

a) assembling a source program to form an executable program in a manner that identifies and marks certain pairs of instructions for parallel execution;

b) fetching the executable program into a processing engine in a manner that provides marked pairs of instructions for parallel execution;

c) discovering a resource conflict within a marked pair of instructions in accordance with a set of parallelism rules indicating the pair of instructions were erroneously marked for parallel execution; and d) discarding at least one instruction of a marked pair of instructions in response to the step c), such that the discarded instruction is not executed.

25. The method of claim 24, wherein step a) comprises rearranging selected bits within certain identified pairs of instructions to add a tag field to mark the pair of instructions.

26. The method of claim 24, wherein step a) comprises marking a pair of instructions by asserting a parallel enable bit in at least one of the instructions of the pair of instructions.

* * * * *